US012632896B2

(12) United States Patent
Zhang et al.

(10) Patent No.: US 12,632,896 B2
(45) Date of Patent: May 19, 2026

(54) COMPUTING DEVICES, COMPUTER PROGRAM PRODUCTS, AND METHODS FOR EFFICIENT RENDERING PIPELINE FOR MAKEUP INCLUDING VTO UI OPTION CONFIGURATION/SELECTION AND LOOKS

(71) Applicant: L'Oreal, Paris (FR)

(72) Inventors: Elisabeth Zhang, Toronto (CA);
Berkly Foster, Toronto (CA)

(73) Assignee: L'Oreal, Paris (FR)

( * ) Notice: Subject to any disclaimer, the term of this patent is extended or adjusted under 35 U.S.C. 154(b) by 104 days.

(21) Appl. No.: 18/592,278

(22) Filed: Feb. 29, 2024

(65) Prior Publication Data

US 2025/0278779 A1     Sep. 4, 2025

(51) Int. Cl.
 *G06Q 30/00* (2023.01)
 *G06Q 30/0601* (2023.01)
 *H04L 65/401* (2022.01)

(52) U.S. Cl.
 CPC ..... *G06Q 30/0643* (2013.01); *H04L 65/4015* (2013.01)

(58) Field of Classification Search
 CPC ........... G06Q 30/0643; G06Q 30/0641; G06Q 30/06431; G06Q 30/06432;
 (Continued)

(56) References Cited

U.S. PATENT DOCUMENTS 9,538,130 B1  1/2017 Ford
10,936,175 B2 * 3/2021 Chou ................... G06F 3/0482
(Continued)

FOREIGN PATENT DOCUMENTS

WO   2022/146615 A1   7/2022
WO   2022/146766 A1   7/2022
WO   2024/086801 A2   4/2024

OTHER PUBLICATIONS

C. Li, K. Zhou, H.-T. Wu and S. Lin, "Physically-Based Simulation of Cosmetics via Intrinsic Image Decomposition with Facial Priors," in IEEE Transactions on Pattern Analysis and Machine Intelligence, vol. 41, No. 6, pp. 1455-1469, Jun. 1, 2019, doi: 10.1109/TPAMI.2018.2832059. (Year: 2019).*

(Continued)

*Primary Examiner* — Arielle E Weiner
(74) *Attorney, Agent, or Firm* — Christensen O'Connor Johnson Kindness PLLC

(57) ABSTRACT

There is provided device, system and method embodiments for streamlining the applying of an effect (e.g. a virtual try on ("VTO") effect) to an object appearing in a sequence of video frames such as for video chat, conferencing or teleconsultation applications. Embodiments and/or features of a user interface such as for video chatting/conferencing or teleconsultation are provided. UI features can include live and preview modes, recommendations using predefine looks, look refinement, look ordering, and access to e-commerce purchase interface. In an embodiment, operations of i) effect rendering, and ii) object landmark determining are performed in parallel where effect rendering applies an effect in association with landmarks determined for the object to define a sequence of output video frames with the effect applied.

14 Claims, 10 Drawing Sheets

(58) Field of Classification Search
CPC ....... G06Q 30/06433; G06Q 30/06434; G06Q
30/06435; G06Q 30/0644; G06Q
30/06442; G06Q 30/06443; G06Q
30/06444; H04L 65/4015
See application file for complete search history.

(56) References Cited

U.S. PATENT DOCUMENTS

| | | | | |
|---|---|---|---|---|
| 12,315,090 | B1 * | 5/2025 | Suresh | G06V 20/20 |
| 12,380,484 | B1 * | 8/2025 | Chaturvedi | G06Q 30/0631 |
| 2017/0256084 | A1 * | 9/2017 | Iglehart | G06V 40/16 |
| 2022/0202168 | A1 * | 6/2022 | Troutman | G06T 19/006 |
| 2022/0377253 | A1 * | 11/2022 | Liu | H04N 5/272 |
| 2023/0007189 | A1 * | 1/2023 | Balaji | H04N 7/152 |
| 2023/0022986 | A1 * | 1/2023 | Pranger | H04N 21/4318 |
| 2025/0088650 | A1 * | 3/2025 | Kalra | H04N 19/436 |

OTHER PUBLICATIONS

Cao, C., et al., "Stabilized Real-time Face Tracking via a Learned Dynamic Rigidity Prior," ACM Transactions on Graphics, vol. 37, No. 6, Article 233, Nov. 2018, 11 pages.
Patwardhan, K.A., et al., "Video Inpainting of Occluding and Occluded Objects," IEEE International Conference, vol. 2, Sep. 2005, 6 pages.
Yu, F., et al., "Scaling Neural Face Synthesis to High FPS And Low Latency By Neural Caching," 2023 IEEE/CVF Winter Conference on Applications of Computer Vision (WACV), IEEE, Jan. 2, 2023, pp. 3463-3472.
Zhong, X., et al., "MV-TON: Memory-based Video Virtual Try-on Network," Proceedings of the 29th ACM International Conference on Multimedia, Oct. 2021, 10 pages.
Naresh, S., "How to Use Zoom's Studio Effects Feature," <https://www.maketecheasier.com/use-zooms-studio-effects-feature>, Feb. 23, 2021, 12 pages.
"Previewing Your Video Before Joining," <https://support.zoom.com/hc/en/articleid=zm_kb&sysparm_article=KB0061118>, Feb. 12, 2025, 6 pages.
"Best Virtual Makeup Try-on Solutions," <https://www.banuba.com/blog/best-virtual-makeup-try-on-solutions>, Jul. 12, 2023, 12 pages.
Written Opinion of the International Searching Authority mailed Apr. 14, 2025, issued in corresponding International Application No. PCT/EP2025/055423, filed Feb. 27, 2025, 15 pages.
International Search Report mailed Apr. 14, 2025, issued in corresponding International Application No. PCT/EP2025/055423, filed Feb. 27, 2025, 5 pages.
Preliminary Search Report and Written Opinion mailed Dec. 17, 2024, issued in corresponding French Application No. FR2406152, filed Jun. 11, 2024, 8 pages.
Bouguet, Jean-Yves, "Pyramidal implementation of the lucas kanade feature tracker," Intel Corporation, Microprocessor Research Labs, 1999; 9 pages.
Liu, W., et al., "SSD:Single Shot MultiBox Detector," Dec. 29, 2016, 2, 2023, pp. 3463-3472.

* cited by examiner

COMPUTING DEVICES, COMPUTER PROGRAM PRODUCTS, AND METHODS FOR EFFICIENT RENDERING PIPELINE FOR MAKEUP INCLUDING VTO UI OPTION CONFIGURATION/SELECTION AND LOOKS

FIELD OF INVENTION

The present disclosure relates to image processing and applications using image processing such as virtual try-on (VTO) applications, augmented reality applications, virtual reality applications and applications incorporating features of same, such as video chat, teleconsultation, Virtual Reality (VR) chat, Augment Reality (AR) chat, or video conference applications. More particularly, the application relates to apparatus, systems and methods for an effects rendering pipeline, including makeup effects.

BACKGROUND

With makeup VTO technology, makeup is applied virtually onto a photo or a live video of the user's face. An example application directed to VTO is an e-commerce application to allow customers to try on makeup products virtually to aid in purchasing decisions.

Another application of this technology includes digitally applying virtual makeup or other visual effects onto the user's virtual image during a video conference event. This provides a convenient way for users to appear in meetings with effects such as makeup applied.

However, applying this technology to applications such as teleconsultation, VR Chat, or video conferencing, comes with various challenges. Challenges include face movement, lip movement (e.g., talking), relative face size in the overall image, (partial) face occlusion, and sufficient video frame rate with low latency to provide smooth video, among others. For example, it is common for users to be talking or rotating their head while on a call. This means that both the face tracking and makeup rendering need to be more robust to different lip movements and large face rotations. Users may also be further away from the camera, making the face appear smaller in the captured image(s) of the video so the face tracker must be able to detect small faces (relative to the overall video dimensions). Additionally, it is not uncommon for part of the face to be occluded during a call. For example, the user may have their hand occluding their mouth, or be holding a cup which occludes part of the face. In these scenarios, makeup should not appear in areas where there is occlusion. Further, video conferencing requires the video to be run at a sufficiently high frame rate and with a low latency to provide a smooth experience putting demands on image processing time.

It is desired to minimize imperfections in the VTO so as not to break the realism of the effect, distracting other meeting participants.

SUMMARY

To address these challenges, in accordance with embodiments, an augmented reality makeup pipeline with improved efficiency has been developed, as well as various techniques to address the above challenges.

There is provided device, system and method embodiments for streamlining the applying of an effect (e.g. a virtual try on ("VTO") effect) to an object appearing in a sequence of video frames such as for video chat, conferencing or teleconsultation applications. Embodiments and/or features of a user interface such as for video chatting/conferencing or teleconsultation are provided. UI features can include live and preview modes, recommendations using predefine looks, look refinement, look ordering, and access to e-commerce purchase interface. In an embodiment, operations of i) effect rendering, and ii) object landmark determining are performed in parallel where effect rendering applies an effect in association with landmarks determined for the object to define a sequence of output video frames with the effect applied.

In an embodiment, there is provided a computing device of claim comprising a processor and a non-transient storage device storing computer executable instructions for execution by the processor to cause the computing device to: provide a video chat, video conference, or teleconsultation application to stream video frames to at least one other computing device, the application integrated with a virtual try on (VTO) pipeline to apply one or more effects to the frames to be streamed; wherein the application is configured to present a graphical user interface (GUI) via a display screen, the GUI having: a preview mode in which to receive input to select the one or more effects from a plurality of effect options, the preview mode configured to present the one or more effects applied to a sequence of preview frames via the display screen and without streaming the preview frames to the at least one other computing device; and a live mode configured to apply the one or more effects and to stream the frames to which the effects are applied in the live mode.

In an embodiment, subsets of the plurality of effects are grouped as respective looks, and the GUI provides a look selection interface to select a one of the looks to select the one or more effects grouped for the look.

In an embodiment, each of the one or more effects is associated with a product and, responsive to the selection of one of the looks, the GUI is configured to present a selected look interface having respective sub interfaces for each respective effect of the one or more effects of the look, each respective sub interface providing i) product information for the respective product associated with the respective effect and ii) a refinement control to refine a selection of the respective effect.

In an embodiment, the refinement control is configured for selecting a different product for the respective effect so that the respective effect provides a virtual try on of the different product. In an embodiment, the respective refinement control is configured to turn off the respective effect so that the respective effect is not applied to the frames.

In an embodiment, each of the one or more effects is associated with a product and, responsive to the selection of one of the looks, the GUI is configured to present a selected look interface having respective sub interfaces for each respective effect of the one or more effects of the look, each respective sub interface providing i) product information for the respective product associated with the respective effect and ii) a buy now control to initiate an ecommerce interface for product purchasing.

In an embodiment, each of the one or more effects is associated with a product and the GUI is configured to provide access to initiate an ecommerce interface for product purchasing.

In an embodiment, the plurality of effects are any of makeup effects, hair effects or nail effects.

In an embodiment, the look interface orders a presentation of the respective looks for selection to make user recommendations.

In an embodiment, the order of the respective looks is determined in accordance with user information processing, the user information comprising one or more of: a users' existing makeup, a user's face shape, a user's skin tone, or any respective looks as recently selected. In an embodiment, one or more of the users' existing makeup, the user's face shape, or the user's skin tone is determined through processing the sequence of frames.

In an embodiment, the order is prioritized in responsive to user favorite selection of a respective look such that favorite looks are ordered ahead of other looks and the other looks are ordered in accordance with the user information processing.

In an embodiment, the preview mode is invokable prior to joining a particular instance of a video chat or conference, integrated with a video chat or conference user interface to configure video and audio controls for the instance.

In an embodiment, the preview mode is invokable during participation in an instance of a video chat or conference thereby to stop any streaming of frames of video for the instance. There is provided a computer program product comprising a non-transient storage device storing computer readable instructions that when executed by a processor cause a computing device to execute a video chat, video conference, or teleconsultation application to stream video frames to at least one other computing device, the application integrated with a virtual try on (VTO) pipeline to apply one or more effects to the frames to be streamed; wherein the application is configured to present a graphical user interface (GUI) via a display screen, the GUI having: a preview mode in which to receive input to select the one or more effects from a plurality of effect options, the preview mode configured to present the one or more effects applied to a sequence of preview frames via the display screen and without streaming the preview frames to the at least one other computing device; and a live mode configured to apply the one or more effects and to stream the frames to which the effects are applied in the live mode.

There is provided a computer implemented method comprising: executing a video chat, video conference, or teleconsultation application to stream video frames to at least one other computing device, the application integrated with a virtual try on (VTO) pipeline to apply one or more effects to the frames to be streamed; wherein the application is configured to present a graphical user interface (GUI) via a display screen, the GUI having: a preview mode in which to receive input to select the one or more effects from a plurality of effect options, the preview mode configured to present the one or more effects applied to a sequence of preview frames via the display screen and without streaming the preview frames to the at least one other computing device; and a live mode configured to apply the one or more effects and to stream the frames to which the effects are applied in the live mode.

BRIEF DESCRIPTION OF DRAWINGS

FIG. 5 is an illustration of a computing environment, in accordance with an embodiment, such as for performing a virtual try on.

FIG. 6 is an illustration of a computing environment, in accordance with an embodiment, such as for performing a video chat or video conference having integrated virtual try on.

DETAILED DESCRIPTION

Pipeline Optimization

Figure 1:
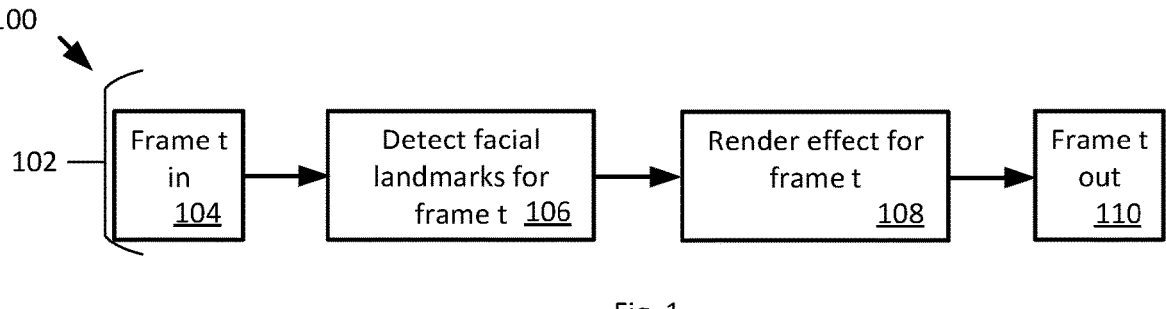
FIG. 1 is a block diagram of operations of a single threaded effects pipeline in accordance with a prior art embodiment.

In accordance with embodiments of the prior art, an effects rendering pipeline (e.g. a flow of operations of a computing device) such as for applying a makeup effect to an image, is generally sequential in nature and involves a single thread of operations. FIG. 1 is a block diagram of operations of a single threaded effects pipeline in accordance with a prior art embodiment. Pipeline 100 comprises a single thread 102. A current frame to be processed is denoted as frame t. An immediately previous frame that was processed is denoted as frame t–1 and an immediately next frame to be processed is denoted as frame t+1. Frame t is received at operations 104 for processing sequentially at operations 106 such as by a landmark detection component (e.g. of a face tracking engine). Thereafter, an effects rendering component processes effects at operations 108 to produce frame t for output at operations 110, where at output frame t is with one or more effects applied, for example.

Figure 2A:
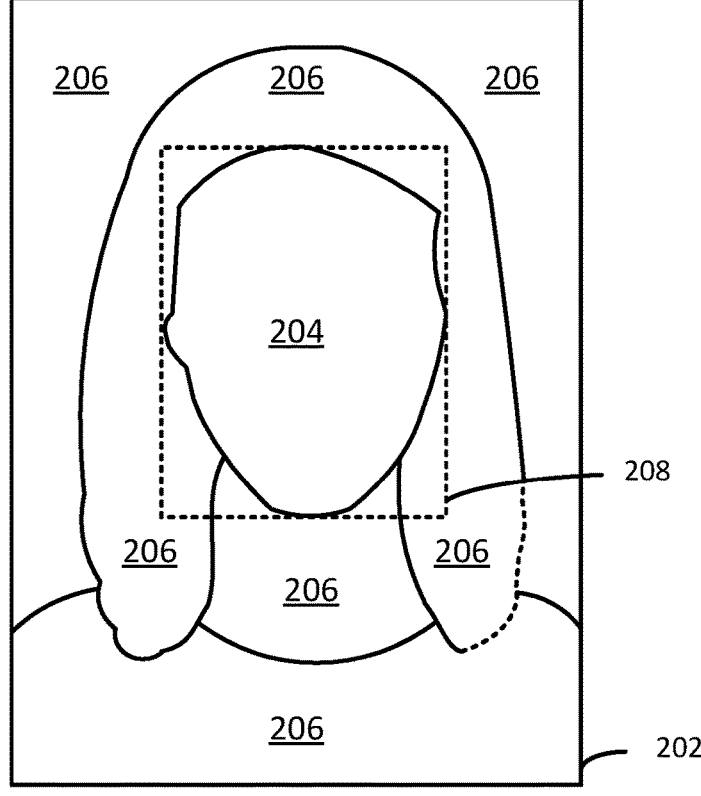
FIG. 2A is an illustration showing a representative frame t (an example of a face image) including a face and background.

The face tracker comprises, in an embodiment, one or more deep neural networks (DNN) for such a purpose. In an embodiment, each DNN comprises a MobileNetV2 backbone, in accordance with an embodiment. In an embodiment, the face tracker is adapted to track (i.e. localize) classes of objects related to a face, including a face object itself. Output from such a face tracker can comprises a bounding box or mask or other structure to derive a cropped frame (e.g. a cropped face image). In a cropped frame, for example, any background in the frame, such as frame t, is minimized. FIG. 2A shows representative frame t (an example of a face image 202) including a face 204 and background 206. Background may comprise other portions of the subject as well as non-subject portions. A bounding box 208 shown as a dotted line box shows coordinates for defining a cropped image including face 204 and minimized background content (some of background 206).

In embodiment, the landmark detection component or face tracker is configured to determine (e.g. predict) a location of a face in a frame and locations within the face of one or more facial landmarks (e.g. semantic facial features) of the face. In an embodiment such features comprise a face contour (e.g. portions of a jawline, chin or both), a nose, an inner mouth, an outer mouth, a left eye, a right eye, a left brow and a right brow such as is shown in FIG. 2B.

Figure 2B:
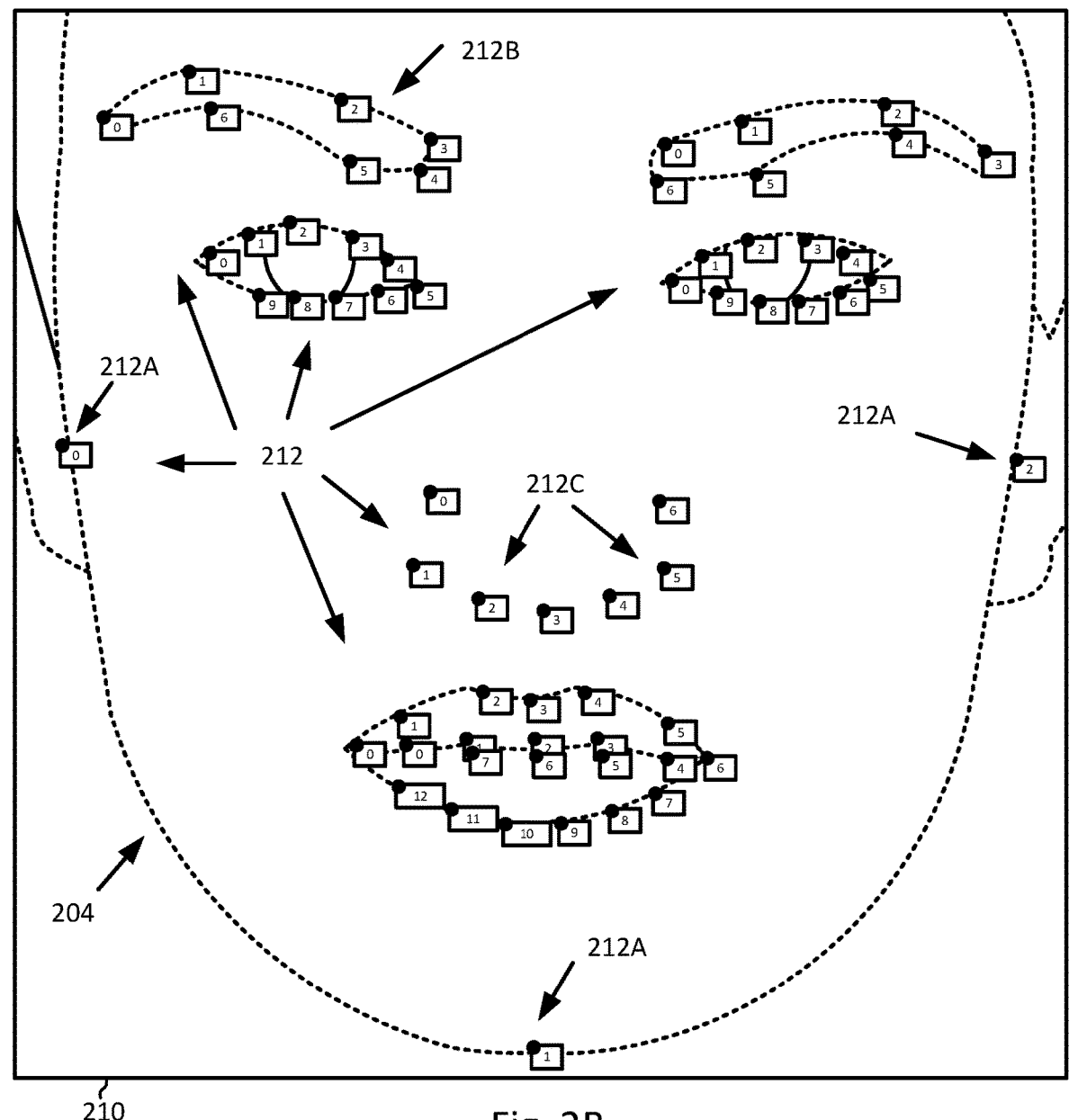
FIG. 2B is an illustration of output of a face tracker of an effects pipeline showing a cropped face image and groups of face points in accordance with an embodiment.

FIG. 2B is an illustration of output of a face tracker (not shown) of an effects pipeline showing a cropped face image 210 of a face 204, such as described, and face points 212 in accordance with an embodiment. Respective groups of face points 212 comprise, in an embodiment, face contour face points 212A, eyebrow face points 212B, and nose face points 212C, etc., for each object for which face points are determined. The depiction is of an annotated cropped face image 210 with the groups of the face points for purposes of illustration. The face tracker output need not comprise an annotated image and the output can be separate data. The face points in an individual group are numbered or indexed (e.g. 0, 1, 2, . . . ) and assist with defining the contour of the detected object. The face tracker assigns each point so that it is placed at consistent locations relative to the contour of the object it is denoting. For example, a particular point might always be at a right corner of the mouth. In an example, the face points are X,Y pixel coordinates, relative to the cropped face image 210 and are associated with respective detected objects from (e.g. one of) the networks of a face tracker.

Figures 3, 4:
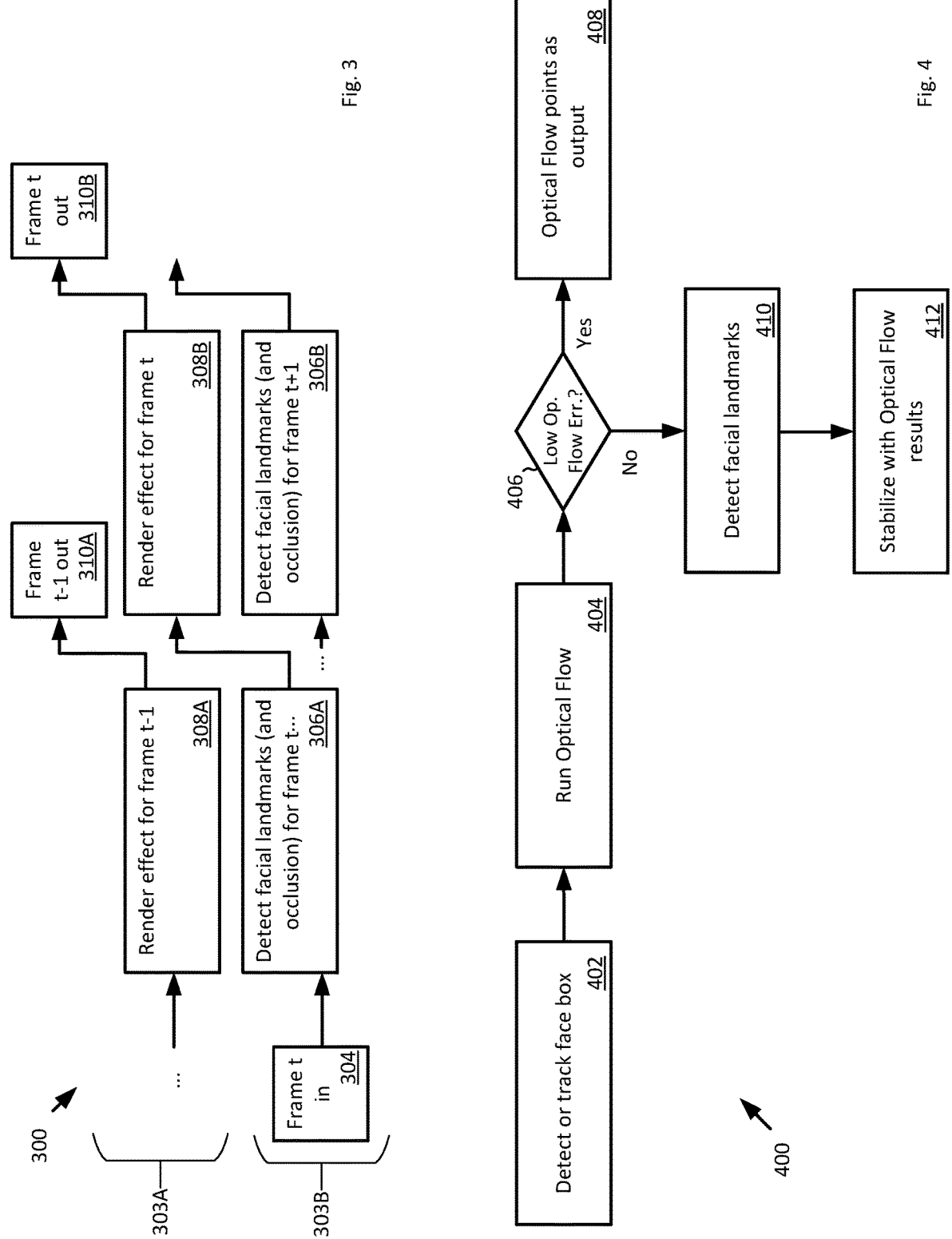
FIG. 3 is a block diagram of operations a double threaded effects pipeline in accordance with an embodiment.
FIG. 4 is a flow chart of face tracking operations in accordance with an embodiment.

FIG. 3 is a block diagram of operations 300 a double threaded (or multithreaded) effects pipeline in accordance with an embodiment. A first thread 303A relates to rendering and a second thread 303B relates to detection of facial landmarks.

Thread 303B shows at operations 304 receiving frame t. Operations to receive a frame t−1 and t+1 are not shown for brevity. At operations 306A, facial landmarks and optionally occlusion is detected for frame t. At operations 306B, facial landmarks and optionally occlusion is detected for frame t+1. Thread 303A shows a rendering of effects to frame t−1 at operations 308A and an output of such frame t−1 at operations 310A as well as rendering of effects to frame t at operations 308B and an output of such frame t at operations 310B. Operational output from operations 306A are provided to operations 308B. FIG. 3 shows operations overlapping in time, to achieve parallel processing, such that effects are rendered to frame t−1 while facial landmark detection is performed on frame t. Similarly, facial landmark detection is performed on frame t+1 as effects are rendered on frame t.

The pipeline 300 is optimized by making the effect (e.g. makeup) rendering and face (e.g. object) tracking operations execute by a computing device in parallel in order to increase the frame rate. In theory, this can result in up to a 2× increase in frame rate, but the actual improvement depends on various factors such as relative timing for the rendering vs tracking as well as any overhead incurred from multi-threading. The speedup is modeled by the equation:

$$s = \frac{t_{rendering} + t_{tracking}}{\max(t_{rendering}, t_{tracking}) + t_{threading\ overhead}}$$

Similar tracking and rendering components to those described in relation to FIG. 1 can be utilized in an embodiment.

In an embodiment, the landmark detection component or face tracking engine additionally detects facial occlusions, determining which part of a face is not present, for example. In an embodiment, the one or more DNNs are configured, such as through training, to at least one of classify, localize or segment for an occluding object (e.g. a facemask or other objects). In an embodiment, as previously noted, the one or more DNNs are configured as MobileNetV2 DNNs.

In an embodiment, the resulting face tracker with its one or more deep neural networks provides an engine for localizing face features such as for use in an application providing a VTO experience, described further herein below.

Improvements to Face Tracking

Face Landmarks Detection Optimization

Object localization using deep neural network processing can result in jitter or other instability between images. That is, the predicted location of an object in a first image by a DNN can be perceptibly different from the predicted location of the same object in a second image by the DNN. This is particularly perceptible when the first and second images are two successive frames of a video and an effect is applied in response to the predicted locations. The effect moves with the jitter. Tracking the object between successive frames and rendering an effect over the input frames can cause the effect to jitter or move in a way that does not appear to match the underlying input frames when displayed together.

In an embodiment stabilization is applied to the localization of a detected object produced by a DNN processing a current frame. In an embodiment, such as for providing a VTO experience from a "live" stream of video (e.g. a selfie video or video conferencing or chat video), each frame (e.g. as successive images) of the video is processed to detect and localize the objects, and to render an effect in accordance with a product or service to be virtually tried on. The effect is applied at one or more locations or regions relative to at least one of the detected objects.

In an embodiment, prior to rendering, the locations of the detected objects (e.g. at least the ones associated with the effects) are stabilized to smooth tracking. These stabilized locations are used for rendering the effect. The effect can be applied at a stabilized location for a detected object (e.g. a stabilized brow location, or lip location), or a region adjacent to one or more detect objects such as an eyelid region adjacent to a stabilized location of a detected eye. In some images, such as where a facemask is worn, not all objects are located.

In an embodiment, stabilization is performed using an optical flow technique (e.g. "optical flow tracking") that predicts a location of an object in a current frame. In an embodiment, locations of face points, such as are output from a face tracker as previously described, can be stabilized.

In an implementation, optical flow tracking operations are performed on each frame for the purposes of temporal stabilization of the facial landmarks. Given the image and landmarks for the previous frame and the current frame image, optical flow can predict the location of the landmarks for the current frame. The prediction is combined with the output of the face landmarks model following a stabilization algorithm as set forth below.

Stabilization processing is resource intensive. According to an embodiment, detected objects are grouped by importance to the task: i.e. by importance to the VTO experience. In an embodiment, locations of detected objects related to the mouth and eyes are stabilized using a blending of a tracker prediction from a current frame and an optical flow prediction for the current frame that is responsive to stabilized locations in a previous frame; and locations of detected objects related to the brows, nose and face contour are stabilized using an exponential moving average filter responsive to a net velocity of an object's face points over previous n frames.

Below is an embodiment of stabilizing operations Stab-1 to Stab 5a/5b, which operations comprise:

Stab-1. Obtain a face points prediction from a face tracker engine (e.g. 104A or 104B) as trackerP$_t$. The tracker prediction trackerP$_t$ relates to a current frame at time t of a video. The previous frame is at previous time t−1. The tracker prediction includes locations of the variously detected objects e.g., a set of face points per detected object, such as per FIG. 2B. Stabilization seeks to produce stabilized face points p$_t$ per detected object for a current frame. Stabilized face points (stabilized location) per detected object for a previous frame produced by the stabilizing operations are denoted as $p_{t-1}$.

Stab-2. In an embodiment, the face points received from the face tracker, such as those representing an object contour as shown in FIG. 2B, are grouped by object as left eye, right eye, left brow, right brow, nose, outer mouth, inner mouth, and face contour groups of points (e.g. a subset of trackerP$_t$ for each object). In an embodiment, the objects are assigned an importance rating, which, in an embodiment is one of two ratings (e.g. higher/lower importance). In an embodiment, stabilization for an object is performed in response to the importance rating using one set of operations for the higher importance objects and another set of operations for the lower importance objects. In an embodiment, the stabilization operations performed for the objects of higher importance are more accurate but also more resource and/or processing intensive than the operations performed for objects of lower importance. Thus the objects are assigned an importance rating that balances accuracy with device performance criteria (e.g. processing time/memory usage, etc). In an embodiment, the objects left eye, right eye, outer mouth, and inner mouth are assigned the higher importance rating and the objects left brow, right brow, nose, and face contour are assigned the lower importance rating. In an embodiment, eyes and lips are prioritized, for example, because many effects relate to eyes and lips.

Stab-3. For the higher importance objects: Apply an optical flow function to $p_{t-1}$ for only the higher importance objects to get optFlowP$_t$. The function optFlow calculates an optical flow (e.g., image velocity) for a sparse feature set using the iterative Lucas-Kanade method with pyramids (previous frame pyramid and current frame pyramid). (See Bouguet, J.-Y. (1999). Pyramidal implementation of the Lucas Kanade feature tracker. At time of filing, available at semanticscholar.org). It will be understood that optFlowP$_t$ for a particular object represents predicted face points for the object for the current frame responsive to the stabilized face points (locations) $p_{t-1}$ produced for the object in the previous frame. In an embodiment implemented with an optical flow function by OpenCV, the points for all of the objects of higher importance are provided together, for example, rather than processing each object separately.

Stab-4. For the higher importance objects: Blend using a blendingfactor and correct if distance between tracker location and optflow location is above a threshold: At regular intervals, set blendingFactor=0.4 (a startValue). The regular intervals can be based on time or a frame count (e.g. a rough time equivalent) e.g. every 1.3 seconds or every 40 frames. Time may be preferred for consistency as frame count to approximate time relies on processing speed. On every frame, run blendingFactor*=0.080 (a decayValue). The blending factor is used to control the blend between trackerP$_t$ and optFlowP$_t$ and is reset to the startValue (e.g. 0.4) to avoid having optFlowP$_t$ drift too far away from trackerP$_t$. Over time the optflow points and face tracker points may drift apart. If blending makes an abrupt change, then blending could result in a jarring result.

For each blending group of points (left eye, right eye, inner mouth, outer mouth):

Stab-4.a. Blend based on blending Factor:

$$p_t = blendingFactor * trackerP_t + (1 - blendingFactor) * optFlowP_t$$

Stab-4.b. Blend based on distance—compare pixel distances between corresponding face points of trackerP$_t$ and optFlowP$_t$. For the mouth object, as an example, compare corner of mouth face point from trackerP$_t$ to same face point from optFlowP$_t$. If trackerP$_t$ and optFlowP$_t$ are too far apart, blend towards trackerP$_t$:

$$amount = min\left(\frac{\|optFlowP_t - trackerP_t\|}{distanceBlendingNorm}, 1.0\right)^6$$

$$p_t = amount * trackerP_t + (1.0 - amount) * p_t$$

where distanceBlendingNorm is a normalization factor for the point distance, and ( ) is used to make small values smaller. For example, distanceBlendingNorm is 5 pixels in an embodiment.

Stab-5. For the lower importance objects: Apply an exponential moving average filter to the points of left brow, right brow, nose, face contour.

Stab-5.a. For each group, the net velocity v is calculated and averaged over the previous n frames. In an embodiment, the velocity calculation uses the tracker points for both the previous frame and current frame trackerP$_t$ and trackerP$_{t-1}$, and doesn't use the stabilized points $p_{t-1}$ for the previous frame These stabilize points are eventually used when applying the blending determined using the velocity calculation result. A reason for this is that using the tracker points would allow operations to more quickly pick up changes in the velocity, as opposed to using the stabilized points.

$$velocity = \frac{\sum_{i=1}^{n} trackerP_t - trackerP_{t-1}}{n}$$

$$v = velocity_{group} = \frac{\left\|\sum_{i \in group} velocity_i\right\|}{n_{group\ pts}}$$

Stab-5.b. The updated face points coordinates are calculated using a blending factor α:

$$\alpha = max\left(min\left(\frac{1}{transitionSpeedFactor} * v, 1\right), 0.1\right)^2$$

$$p_t = \alpha * trackerP_t + (1.0 - \alpha) * p_{t-1}$$

where transitionSpeedFactor is a constant that controls the impact of v, and is 1.5 by default.

Thus, in relations to blending operations Stab-4.a and Stab-4.b a form of linear interpolation is performed for each of the eye and mouth groups respectively (i.e. for respective facial features from the more important group of facial features). In particular, the two locations (tracker location and the optflow location (second location)) for a respective face point in the current image are blended according to a blending factor. The blending factor weights the contribution of each of the tracker location and the optflow location to produce a first blended result. A second blending operation producing the current stabilized location and is responsive to distance between the two locations (e.g. a distance between pixel coordinates of respective face points of the tracker location and corresponding respective face points of the second tracker location) and a distance normalization factor to move the first blending result toward the tracker location. Thus the blending factor blends the tracker location and optiflow location initially in favor of the optiflow location-itself based on previous stabilized locations; and applies a correction if the two locations are sufficiently distant, and generates the current stabilized location from the first blended result as moved toward the tracker location.

In an embodiment, the blending factor for the first blending result varies (decays) from a max. amount, for a period (e.g. a series of frames or for a defined time), then the blending factor is reset to the max. amount. As the blending factor decays, the optiflow location is increasingly preferred in the blending. The reset serves to realign the blending should the locations have drifted. For the distance based blending threshold, in an embodiment, the distance normalization factor is 5 pixels.

Thus in relation to operations Stab-5.a and Stab-5.b performed for each of the less important groups (bows, nose and face contour), an exponential moving average filter is applied. In the exponential moving average filter, operations use only the points from the previous and current frame. The previous frame's points implicitly contain information from the older frames due to the iterative application of stabilization across frames. In an alternative approach, not shown, a window of previous location values is determined and averaged. For example, points from the current frame and the previous N frames (for example, N=3), for a total of N+1 frames can be used. The resulting point is calculated as an average of the points across the N+1 frames. The average can be a weighted average, for example having a higher weight on the more recent frames. The weight can further be influenced by the velocity. For example a higher velocity could place an even greater weight on the most recent frame.

However, any method for smoothing time series data could be used as an alternative. Another example could be a Kalman Filter, which tries to estimate the current state by modelling the dynamics of the system (such as predicting the current point using the past velocity) and combining that prediction with the current measurement (the tracker point).

In an embodiment, to speed up the face tracking, an optimization is applied where operations of the face landmarks model (e.g. a DNN of a face tracker) that predict face points for landmarks for a current fame are skipped if the results of the optical flow tracking are determined to be sufficiently accurate. Since the operations of the face landmarks model is the slowest step in the face tracking operations, this can result in significant time savings.

In an embodiment and in relation to the operations Stab-1 to Stab-5a/5B thus described, certain operations thereof may be performed in a different order or omitted as follows. In an embodiment, 1) the optical flow operations of step Stab-3 are performed before the face points detection step of Stab-1; and 2) Optical flow operations are applied to all objects rather than just high importance objects since all objects need to be tracked if the face points model were to be skipped. This means that Stab-5 in relation to low importance objects need not be performed and objects are no longer classified as high or low importance.

In accordance with an embodiment, instead of running the facial landmarks model, the optical flow result can be directly used as the face landmarks result. However, optical flow tracking is not always reliable and errors can accumulate over time, so the facial landmarks model is only skipped if the optical flow error is below a certain threshold or if a certain amount of time has elapsed since the last time the facial landmarks model operations were executed.

Optical flow algorithms such as Lucas-Kanade, referenced above, are able to provide an estimate of the tracking error.

FIG. 4 is a flow chart of face tracking operations 400 in accordance with an embodiment. At 402, operations detect or track a face box such as by executing a deep neural network model trained for same. At 404, operations run an optical flow function such as optflow as described herein. At 406 a measure of an optical flow error is evaluated. If the error is considered to be low (e.g. it is at or below a threshold), then via Yes branch to 408, operations use the optical flow points as output of the face tracking (e.g. for face points) as described herein. If the optical flow error is not low (e.g. relative to the threshold) via No branch to 410, operations perform facial landmark detection. Such detection can be via executing a deep neural network model as described. At 412, operations perform stabilization of the detected points using the optical flow results such as described herein.

The speedup provided by this optimization is heavily dependent on the amount of face movement. The less face movement there is, the greater the speedup. The speedup provided is by the equation:

$$s = \frac{t_{other} + t_{landmarks}}{t_{other} + (1 - p_{skip}) t_{landmarks}}$$

Where $t_{other}$ is time for all steps excluding the face landmarks model, $p_{skip}$ is the probability of the face landmarks model being skipped, with $p_{skip}$ approaching close to 1.0 when there is little face movement.

Face Scale-Invariant Optical Flow Stabilization

In an embodiment, stabilization parameters are scaled based on the image size. However, in an alternate embodiment, stabilization parameters are scaled based on face size. In an embodiment then, parameters related to distance or speed, such as "transitionSpeedFactor" or "distanceBlendingNorm" mentioned above, are defined with respect to a reference size. For example, the reference size is a specific image width (in pixels) when based on image size. The parameters are then scaled based on the ratio of the actual size and reference size to ensure that the stabilization behaves consistently across different sizes. Rather than image size scaling, in an embodiment, face size scaling is preferred, such as in a video conferencing application, to handle a wider range of distances between the face and camera. This allows the stabilization to work more consistently for both faces far away and close to the camera.

Improved Face Box Detection for Small Faces

Herein, a face is considered small if the face box area relative to the image area is below some threshold such as a percentage, but could be a ratio or other measure. In an embodiment, the threshold is <10%. The face box detector can have difficulties in detecting small faces (faces that are far away from the camera). This is because the entire image is downsized to the face box model input size before detection, which causes small faces to become even smaller to the point where the detection may become inaccurate or be missed entirely.

To improve this, the following algorithm is used:

FBD1: If a face has been detected previously and the face box size was small relative to the image, then crop the input image to the last known face box with some padding applied to account for motion;

FBD2: Downsize the input image to the model input size and run the face box model;

FBD3: If a face was detected, record it as the last known face box.

FBD4: If a face was not previously detected but is detected in an uncropped image and the face box is small (i.e. this is a first detection and the face box is small), then re-run the detection with cropping (e.g. using FBD1 to FBD3). This is to handle the case where the first frame contains a small face.

FB5: If no face was detected and a cropping was applied, re-run the detection without the cropping. This is to handle the case where a rapid face movement could cause the face to go out of the cropping region.

Face Box Re-Detection Heuristic Using Face Angles

In an embodiment, face box detection can be omitted for successive frames to speed processing, assuming that the face (or camera) does not move significantly. Operations of the face box detector are thus skipped for most frames and the face box is estimated for the new frame based on the face landmarks from the previous frame. In an embodiment, there are a number of heuristics used to determine when the face box detector is re-run, such as: i) whether a face has been detected previously; ii) the amount of time passed since the last time it was run; or iii) whether the face has been lost.

Predicting the current frame's face box using the previous frame's results works well if the face angle does not change significantly. However, the prediction can be poor if there is a significant change in face angle. In an embodiment, an additional heuristic is incorporated where the face box detector is re-run if there has been a significant change in the face angle (e.g. greater than a threshold) since the last time the detector was run. In an embodiment, a 3D face rotation (e.g. consisting of yaw, roll, and pitch angles (6 degrees of freedom (6DOF))) is estimated from the 2D face points. For example, a static reference 3D face model is used and pairs of 2D/3D points are formed and passed to a Perspective-n-Point (PnP) solver. The PnP solver can estimate the 3D translation and rotation using known techniques. After the face rotation is obtained, the angles are converted into a direction vector. The angle between the current and previous direction vectors is calculated and compared against a threshold (e.g. set to 10 degrees).

Improvements to Rendering

Occlusion Handling

Occlusion handling renders the effect in response to occlusion detection, for example, to avoid rendering an effect where at least portion of the object to which the effect is to be applied is not present in the frame as another object appears in front. An example is to avoid rendering an eye effect when hair has fallen and occludes at least a portion of the eye. A mask representing the occlusion can be used to render to portions that are not occluded. In an embodiment a partial occlusion can trigger no rendering to any portion of the occluded object. Mask occlusion, and binary or Boolean occlusion are discussed further.

To be able to handle occlusion, the renderer is configured to selectively hide different parts of the makeup. In an embodiment, an approach for hiding the makeup depends on what type of occlusion information is available. The occlusion information is comparatively more course or more granular in the embodiments below.

Binary Region Occlusion

In this approach, the face is divided up into regions (such as the left eye, right eye, mouth, etc.) and each region is assigned a Boolean value indicating whether that region is occluded.

The renderer is modified to divide up the makeup rendering into the different occlusion regions and only render into regions that are not occluded.

Mask Occlusion

In this approach, a mask is provided that indicates which pixels of the face are occluded. The mask region could cover certain regions of the face (such as the lips or eyes), or it could cover the entire face.in an embodiment, the mask region is where the occlusion mask should be placed and is specified as some rectangular region of the face (for example, it could be a rectangle covering the entire face or covering just the lips/eyes). The occlusion mask is an image where each pixel indicates the occlusion probability, and this mask is placed and fit onto the mask region.

After rendering the makeup, the renderer would blend back in the original image using the occlusion mask as the blending amount.

Improved Error Tolerance in Lipstick Rendering

Different face tracker landmarks on the lips can have different amounts of expected accuracy. For example, the lip points near the teeth may have lower accuracy on average than the points on the outer edge of the lips. In an embodiment, in the rendering, inaccuracies are made less noticeable by blurring. For example when rendering lipstick, the edges of the lipstick can be blurred to hide imperfections in the lip landmarks. Further, different amounts of blurring for different regions of the lipstick can be applied, in accordance with an embodiment, and the amount of blurring can be dependent on the expected accuracy of the landmarks in that region. This allows the rendering to better handle less accurate regions with-out making the lipstick appear more blurry overall. Two approaches for determining accuracy are provided: One approach is to measure the average error for each landmark after training the face landmarks model, by comparing the predicted landmarks with the ground truth landmarks from the training data. Another approach is to test the face tracker on various people and give a qualitative rating of how accurate are the determinations of different landmarks.

VTO Application

Figure 5:
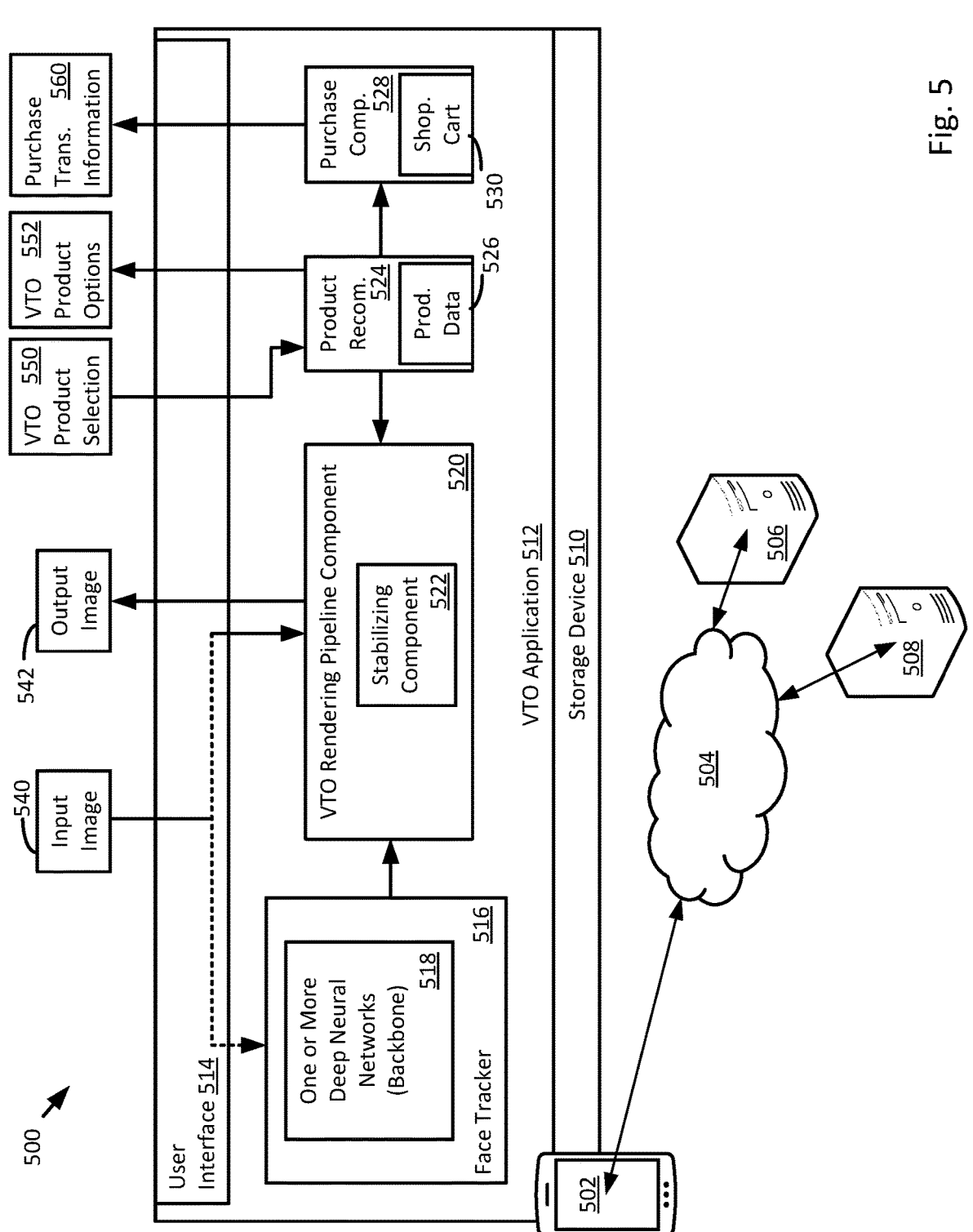

FIG. 5 is an illustration of a computing environment 500, in accordance with an embodiment, such as for practicing one or more method aspects, for example, including but not limited to VTO operations. Computing environment 500 shows a user computing device 502, such as a smartphone, a communications network 504, a server 506 and a server 508. Communications network 504 comprises wired and/or wireless networks, which may be public or private and may include, for example the internet. Server 506 comprises a server computing device such as for providing a website. Server 508 comprises a server computing device such as for providing e-commerce transaction services. Though shown separately, the servers 506 and 508 can comprise one server device. Computing environment is simplified. For example, not shown are payment transaction gateways and other components such as for completing an e-commerce transaction.

Computing device 502 comprise a storage device 510 (e.g., a non-transient device such as a memory and/or solid state drive, etc.) for storing instructions that, when executed by a processor (not shown), cause the computing device 502 to perform operations such as a computer implemented method. Storage device 510 stores a virtual try on application 512 comprising components such as software modules providing, a user interface 514, face tracker 516 with one or more deep neural networks 518 configured for face detection including determining face points, a VTO rendering pipeline component 520 with a stabilization component 522, a product recommendation component 524 with product data 526, and a purchasing component 528 with shopping cart 530 (e.g. purchase data).

In an embodiment, operations of face tracing and effect rendering (e.g by components 516 (face tracker) and 520 (VTO rendering pipeline) are perform in a parallel manner such as shown and described herein (c.f. FIG. 3).

In an embodiment, VTO application is a web-based application such as is obtained from server 506. Though not shown, user device 502 may store a web-browser for execution of web-based VTO application 512. In an embodiment, VTO application 512 is a native application in accordance with an operating system (also not shown) and software development requirements that may be imposed by a hardware manufacturer, for example, of the user device 502. The native application can be configured for web-based communication or similar communications to servers 506 and 508, as is known.

FIG. 5 shows various input and output data or information associated with a use of VTO application 512, for example. Such includes an input image 540 of the user to be processed for a VTO experience, an output image 542 to which product effects are simulated providing a VTO experience, a VTO product selection 550 comprising user input selecting one or more product effects to be simulated, VTO products options 552 comprising options for products to be virtually tried on, for example for selection by a user of device 502, and purchase transaction information 560 comprising purchase information provided to and/or received from a user to purchase a product.

In an embodiment, via one or more of user interfaces 514, VTO product options 552 are presented for selection to virtually try on by simulating effects on an input image 540. In an embodiment the VTO product options 552 are derived from or associated to product data 526. In an embodiment, the product data 526 can be obtained from server 506 and provided by the product recommendation component 524. Though not shown, user or other input may be received for use to determine product recommendations. The user may be prompted, such as via one of interfaces 514 to provide input for determining product recommendations. In an embodiment, the product recommendation component 524 communicates with server 506. Server 506, in an embodiment, determines the recommendation based on input received via component 514 (e.g. and 524) and provides product data accordingly. User interface 514 can present the VTO product choices, for example, updating the display of same responsive to the data received as the user browses or otherwise interacts with the user interface 514.

In an embodiment, the one or more user interfaces 514 provide instructions and controls to obtain the input image 540, and VTO product selection input 550 such as an identification of one or more recommended VTO product options 552 to try on. In an embodiment, the input image 540 is a user's face image, which can be a still image or a frame from a video. In an embodiment, the input image 540 can be received from a camera (not shown) of device 502 or from a stored image (not shown). The input image 540 is provided to face tracker 516 such as for processing to detect objects in the face image using one or more deep neural networks 518 as trained. In an example, the network classifies, localizes or segments for a facemask (or other occluding object) in the image. In an embodiment, example classification for facemask presence is useful to output a request (e.g. an instruction to a user such as via user interfaces 514), to lower or remove a facemask. Such is applicable to any occluding object for which the face tracker engine is trained. In an embodiment, occlusion can be handled at rendering, such as described herein, to avoid rending over an inclusion.

In an embodiment, output (specifics not shown) from the face tracker 516, such as classification results, localization results or segmentation results for one or more detected objects, is provided to VTO rendering pipeline component 520. In an example, the output may comprise a bounding box e.g. 208 of FIG. 2A and, as shown in FIG. 2B, face points 212 (e.g. groups thereof) for detected objects, etc. Input image 540 is also provided (e.g. made available) to VTO rendering pipeline component 520. The VTO product selection 530 is also provided to VTO rendering pipeline component 520 for determining which effects are to be rendered. In an embodiment related to makeup simulation, one or more effects can be indicated such as for any one or more of the product categories comprising: lip, eye shadow, eyeliner, blush, etc.

VTO rendering pipeline component 520, in an embodiment, determines whether to render one or more product effects to the input image 540 to simulate a try on. For example, responsive to facemask classification output, VTO rendering pipeline component 520 can determine not to render a product effect, for example, because a mask (an occlusion) is detected. When a facemask is detected, for example, VTO rendering pipeline component 520 can, optionally, trigger the user interface 414 to ask the user to remove the facemask. A new image (new instance of image 540) can be received and processed by face tracker 516. In an embodiment, images are continuously received as a component of a live stream (e.g. a selfie video). In an embodiment, occlusions are dealt with at rendering so as to avoid rendering over an inclusion, such as described herein.

If VTO rendering pipeline component 520 determines to render the one or more product effects, in an embodiment VTO rendering pipeline component 520 renders effects on the input image 540 such as by drawing (rendering) effects in layers, one layer for each product effect, to produce output image 542. Portions of the operations of VTO rendering pipeline component 520 (e.g. such as for drawing the layers) can be performed by a graphics processing unit, in an embodiment. The rendering is in accordance with product data 526 as selected by VTO product selection 550 and is responsive to the location of detected objects. For example, a VTO product selection of a lipstick, lip gloss or other lip related product invokes the application of an effect to one or more detected mouth or lip-related objects at respective locations. Similarly a brow related product selection invokes the application of a selected product effect to the detected eye brow objects. Typically, for symmetrical looks, the same brow effects are applied to each brow, the same lip effect to each lip or the same eye effect to each eye region, but this need not be the case. In an example, the rendering is applied to a region that is relative to the detected objects, such as adjacent one or more such detected objects. Some VTO product selections comprise a selection of more than one product (e.g. defining a "look") such as coordinated products for brows and eyes or other combinations of detected objects, including the whole face. Product data can define respective "looks" grouping associated products, for example, and associating the look with a name for display via the user interface, such as displayed associated with a control enabling user selection of a look from a group of looks in presented in a list, array or other presentation format. VTO rendering pipeline component 520 can render each effect, for example, one at a time until all effects are applied. The order of application can be defined by rules or in the selection of products e.g. lipstick before a top gloss.

In an embodiment where an occluding object is detected and the location is determined, for example, as represented in a segmentation mask, the rendering can be responsive to such a segmentation mask. Rendering of an effect can be applied to portions of the face that are not occluded. A segmentation mask can indicate the pixels of the face that are available to (e.g. may) receive an effect such as a makeup effect and those pixels that are not available to receive an effect.

User interface 514 provides the output image 542. Output image 542, in an embodiment, is presented as a portion of a live stream of successive output images (each an example of image 542) such as where a selfie video is augmented to present an augmented reality experience. In an embodiment, output image 542 is presented along with the input image 540, such as in a side by side display for comparison. In an embodiment, output image 542 can be saved (not shown) such as to storage device 510 and/or shared (not shown) with another computing device.

In an embodiment, (not shown) the input images comprise input images of a video conferencing session and the output images comprise a video that is shared with another participant (or more than one) of a video conferencing session. In an embodiment the VTO application is a component or plug in of a teleconsultation application or a video conferencing application (each not shown) permitting the user of device 502 to wear makeup during a teleconsultation or video conference (respectively) with one or more other conference participants.

In an embodiment, VTO rendering pipeline component 520 is configured to apply object stabilization (e.g. using stabilising component 522) to stabilize respective locations of detected objects between, for example, successive frames of a video.

While stabilizing component 522 is shown as an included component of VTO rendering pipeline component 520, stabilizing component 522 can be a separate component. In an embodiment, the operations of stabilizing component 522 are configured such as described with reference to operations Stab-1 to Stab-5b herein above. Operations of stabilizing and face tracking of landmarks, in an embodiment, are further in accordance with operations of FIG. 4.

In an embodiment, face tracker 516 localizes facial features but without detecting facemask (or other occluding object) presence. As a result, in such an embodiment, the operations of VTO rendering pipeline component 520 are configured without accounting for occlusions.

Figure 6:
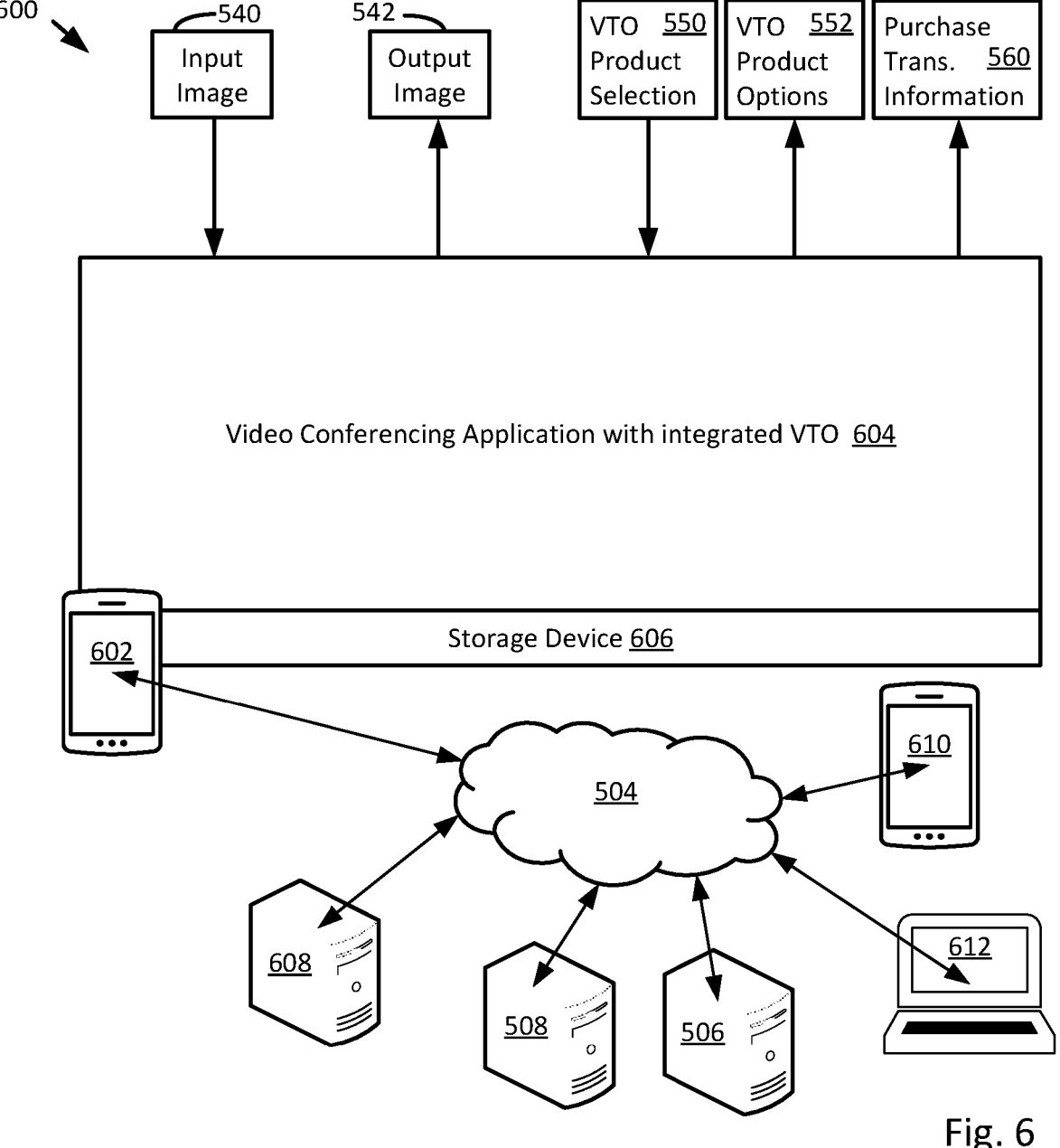

FIG. 6 is an illustration of a computing environment 600, in accordance with an embodiment, such as for performing a teleconsultation or video chat or video conference having integrated virtual try on. Environment 600 is similar to environment 500. In environment 600, a user device 602 provides a teleconsultation or video conferencing application 604 having integrated VTO features. Application 604 is stored to storage device 606 and is shown in a simplified manner. Integrated VTO features are provided such as by the components of VTO application 512 as further described.

Device 602 is configured to additionally communicate with server 608 providing video conferencing services thereby to communicate with one or more other user devices such as but not limited to device 610, device 612 or both devices. Examples of platforms providing a video conferencing service, which are not to be limiting, include MICROSOFT TEAMS™ available from Microsoft Corporation of Redmond, WA; ZOOM ONE™ available from Zoom Video Communications, Inc. of San Jose, CA; and GOOGLE MEET™, available from Google LLC of Mountain View Parkway, among others. In an embodiment, server 608 can be configured to provide the functionality of one or both of servers 506 and 508.

In brief, teleconsultation or video conferencing services permit sharing of live video between two or more user devices communicating via an intermediary device, namely a server. A first user device (e.g. 602) obtains a video stream from a camera (either an internal or external camera coupled thereto) and provides it to server 608 for communication to other participant devices such as device 610, device 612 or both devices (e.g. and their respective users (e.g. conference members in video conferencing, a clinician or beauty advisor in teleconsultation)) that are participating in the conference as maintained by the server 608. Server 608 provides respective video streams received from device 610, device 612 or both devices to device 602. It is understood that server 608 may process (e.g. perform video processing of) any of the video streams it receives and retransmits for a conference or teleconsultation.

Respective user teleconsultation or video conference applications executing on the respective devices present the received video streams such as in accordance with a selected layout or view in a user interface on a display device. A layout or view may show a member who is the active speaker or a pinned conference member or all conference members, etc. as is known.

In an embodiment, application 604 is configured to apply at least one effect to the images originated by device 602, enabling a virtual try on during the teleconsultation or video conferencing meeting, so that other members receive the output images as rendered using the integrated VTO application with the at least one effect applied.

In FIG. 6, input image 540 represents a frame of an input video stream originated from a camera local to device 602 while output image 542 represents a frame of an output video stream determined from one or more frames (e.g. 542) of the input video stream. Each output image 542 is presented in accordance with the user interface or other controls of the application 604. Thus at sometimes during the teleconsultation or conference, output image 542 may not be displayed by device 602 such as when another member has a focus and only that member's stream is being presented. However, output image 542 is communicated to server 608 for retransmission for display be devices 6100, 612 or both according to the respective controls of their local teleconsultation or video conference applications. It is understood that no VTO effects are applied if the camera control is "off" and no camera images are shared out to server 608.

In an embodiment, application 604 is configured with user interfaces having controls to enable a user to select whether to have a VTO effect applied. In an embodiment, the VTO effect is selectable from a plurality of looks. In an embodiment, each look provides at least one makeup effect and preferably a plurality of effects for different makeup products. In an embodiment, looks are associated by product brand and each look has a name. In an embodiment, the user interface is enabled to receive user input to select a preview of a look, invoking the VTO components to process the input video stream and render an output video stream with the look effect(s) rendered for display by device 602. In an embodiment, during the preview, the output video stream is not shared to server 608 and thus not provided to other devices during the period of the preview. In embodiment, the user interface is enabled to present detailed information about each of the products of the look and further enabled to permit purchasing of products.

Figures 7, 8:
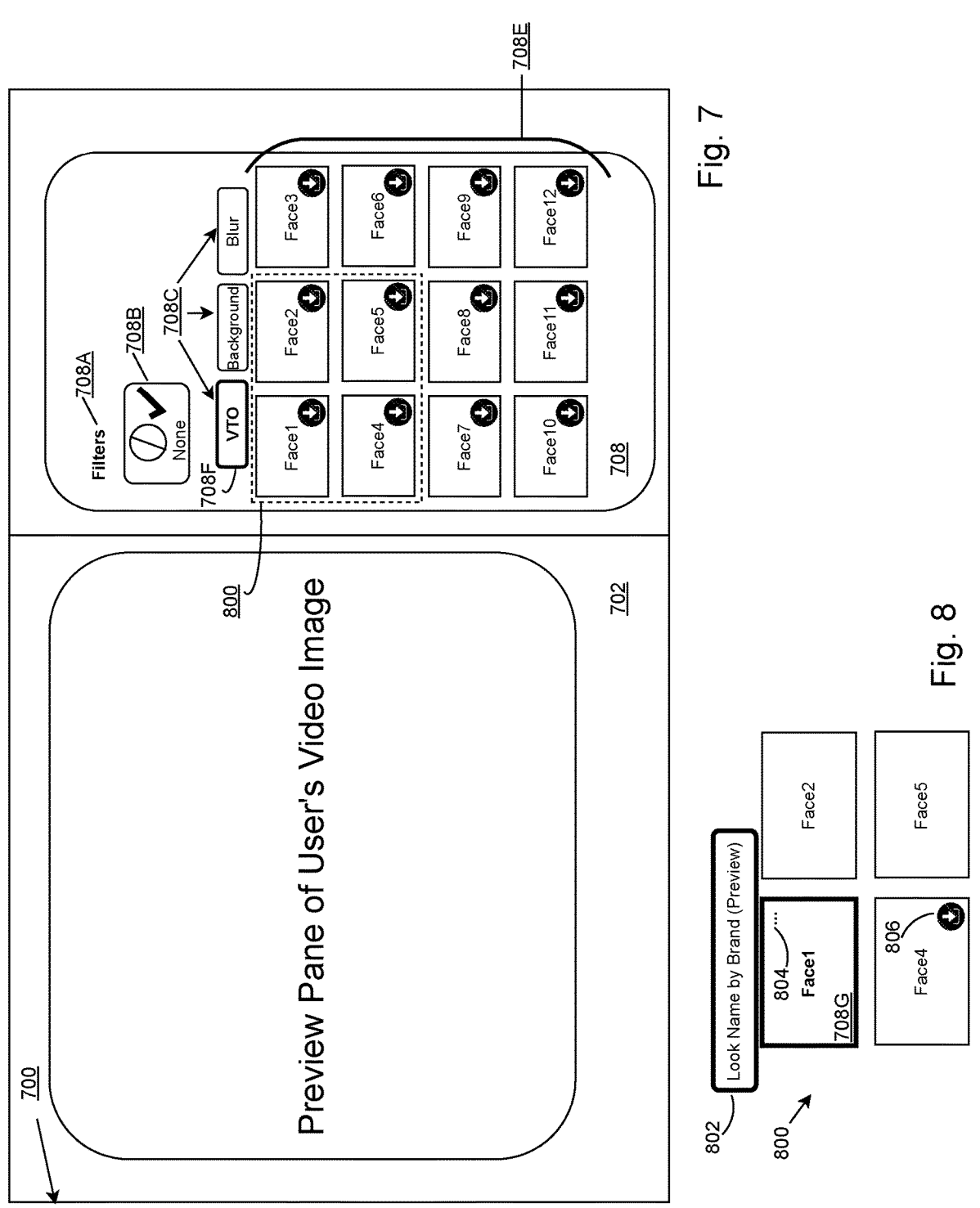
FIGS. 7 to 12 are illustrations of user interfaces of a video chat/conference application with integrated VTO, in accordance with embodiments.

FIG. 7 is an illustration of a portion of a user interface (UI) 700 of a video conference application with integrated VTO, in accordance with an embodiment. FIG. 7 illustrates a portion of a graphical user interface, such as a portion of a window or other interface construct. As is known, the graphical elements present various information and can delineate or identify to a user regions for control in the interface which regions define respective portions of the interface (e.g. divide up the real estate of a display). A graphical element in a particular region can define a UI control (or control) associated with a software function. When the control is engaged by a user input, the control (i.e. the engagement) can invoke associated UI code comprising a portion of an underlying application (software) to perform a function associated with the control. Examples of controls include fields to input information such as alpha-numeric text, icons to invoke an associated action (e.g. mute a microphone), menus (including a drop down or rick click overlay, etc.) to provide additional controls or sub-menus, etc., slider or radial controls to select a data value (e.g. speaker volume control), etc. In an embodiment, the interfaces shown herein such as in any of FIGS. 7 to 12 are gesture-enabled to receive gestural-based user input such as via an applicable hardware input/output (I/O) device or devices. In an embodiment, touch type gestures (touch, tap, swipe, etc.) are receivable via a touch-enabled display screen or via a camera receiving user images of input. In an embodiment, a mouse or other pointing device (e.g. a pen) etc. provides input. Key-based input such as from a real or virtual keyboard can also be enabled.

In an embodiment, when users start the video conferencing experience, they first enter a window where they can adjust their video and audio settings. Here they can have the option to open a video effects menu, and navigate to a region of the interface where they can select makeup VTO look effects.

Interface 700 enables user input for selecting audio and video settings, including video effects. Interface 700 can be presented, for example, prior to joining a conference. Interface 700 comprises region 702 to display a video image of the user when the camera is turned on.

In region 708 there is presented a plurality of effects options comprising filters 708A of which none are presently selected as noted by control 708B in a sub-region of 708. A plurality of controls 708C provide selection of groups of associated filters such as VTO, Background, Blur.

FIG. 7 shows, in the embodiment, a plurality of VTO filter controls 708E are displayed (e.g. as a menu) in a sub-region of region 708 (e.g. below controls 708C). The filters 708E are selected from among filter options associated to controls 708C using control 708F. Selection invokes their display in the sub-region of region 708. In the embodiment, control 708F is highlighted by bolding to show it is active. Bolding is used herein for convenience for patent line drawings; however, color, shading, etc. are useful to highlight in an actual user interface. Region 708 may be scrollable to bring more filters into the display, bringing filters notionally below the bottom of region 708 into the UI and moving tiles notionally off the UI at the top near controls 708C.

Each of the respective filter controls 708E comprises a selectable portion of region 708 (e.g. a sub-sub-region). In the embodiment, each is shown as a card or tile (e.g. 708F) according to common user interface techniques. An alternative control style is an icon (not shown). The illustration in FIG. 7 is simplified. In an embodiment, each label (e.g. "Face1" in tile 708F) is replaced with an image showing a human face and/or additional or other body part(s) having at least one effect applied thereto to suggest the results of selecting that particular filter. In an embodiment, the effect is a makeup effect or a hair effect or a nail effect or any combination of same. These effects are associated with the respective VTO filter effects that are invokable by choosing the tile to make the selected VTO filter active for the video conference or VR Chat. In an embodiment, the VTO filter is able to be previewed (e.g. in a "preview mode") such that the results (e.g. a video stream with the effect of the VTO filter applied to modify the appearance of the user) are displayed in region 702 but the results are not provided to server 608. A control can be provided to enable the user to end the preview mode and use the selected VTO filter in a "live mode" where the results are provided to server 608.

In an embodiment the tiles (filter controls 708E) are associated with respective "looks" each comprising one or more makeup effects. An individual look may comprise a makeup effect or a hair effect or a nail effect or any combination of same. Each look is associated with a name and a source of the product or products upon which the VTO effect is based. Typically the products share a common source represented by a brand (e.g. having a trademark). An example of a look and brand, which is not to be limiting, is Glossy by Maybelline™ (available from L'Oréal, particularly L'OREAL USA CREATIVE, INC. of New York, USA in the United States). Selecting (e.g. clicking etc.) one of the controls such as 708G from controls 708E invokes application of the associated VTO filters for the look to apply the look to the user's video, in the preview mode. In an embodiment, joining a conference stops the preview mode to enter a live mode.

FIG. 8 is an enlarged portion 800 (within the dotted line box) of the interface 700, though following receiving user input thereto. Tile 708G is highlighted in bold as a selected tile 708G among controls 708E. FIG. 8 shows information 802 associated with tile 708G. Information 802 provides text-based information, for example, about the filter associated with tile 708G. In an embodiment, the information provides a name of the look and the brand, e.g. Glossy by Maybelline, and indicates the preview mode. The selection invokes an overlay of the tile to present an ellipses (e.g. three dots with an associated control) 804 inviting further action (e.g. further user engagement such as by a tap etc.). Symbol 806 reflects a status of the filter, namely, whether the filter has been downloaded to the local computing device 602 from a server such as server 608, or another server. In an embodiment the filter comprises various effects data for use to simulate the product as well as additional images, text, etc. for the UI interfaces that provide additional product information, as described further. The filter can be defined in a bundle of data for downloading and unpacking for inclusion in the UI, and for VTO operations. In an embodiment, such as shown in FIG. 7, newly made available filters are sorted to appear in a top of an array of controls (e.g. at 708E) presenting the filters. Other ordering operations are possible as further described below.

Figure 9:
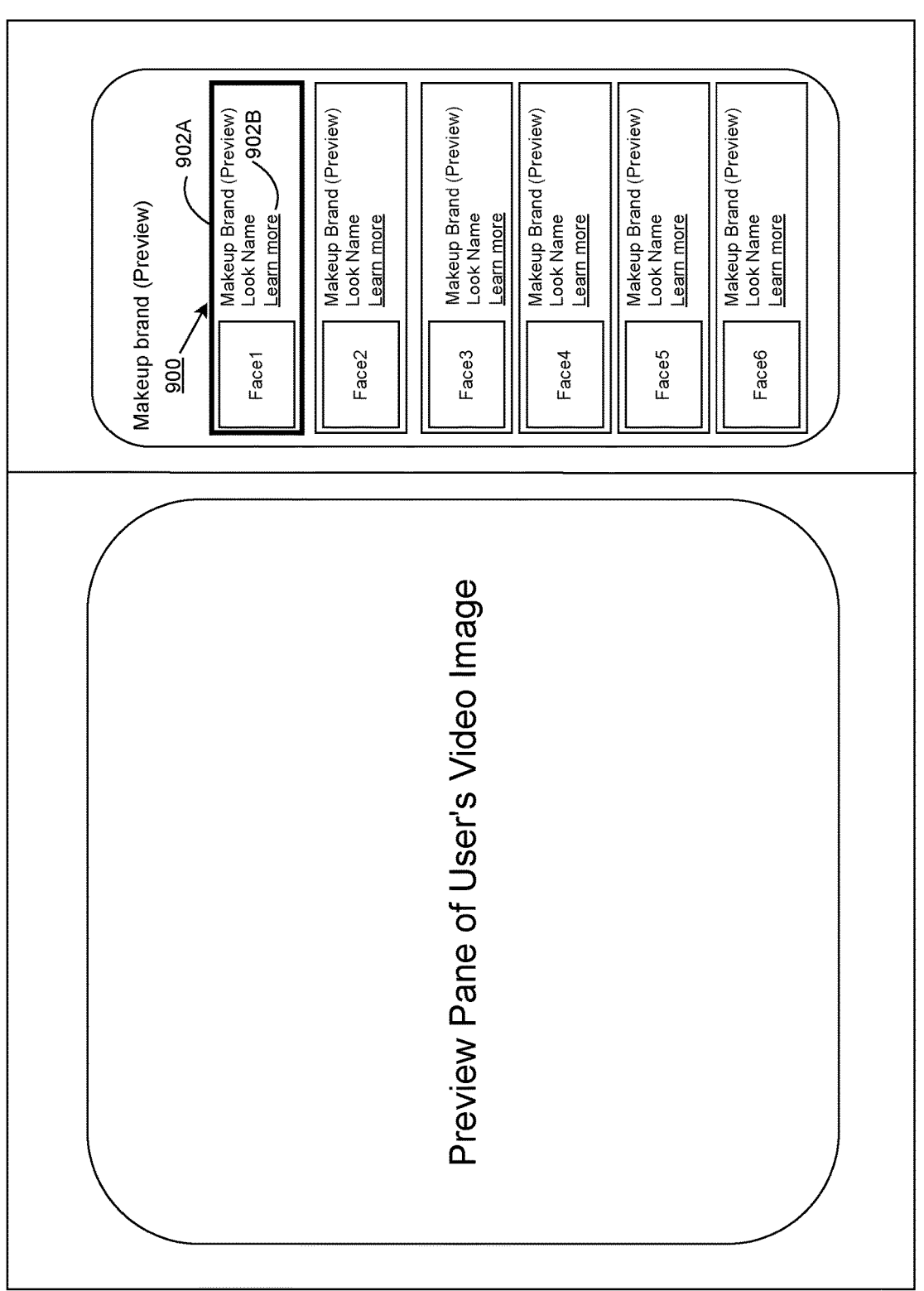

Further selecting the tile (via the ellipsis) changes the UI content displayed in region 708 to display additional look information (e.g. during the preview mode). FIG. 9 shows the portion of the user 700 in which region 708 presents a menu 900 comprising expanded tiles (e.g. 902A) each related to tiles 708E, in accordance with an embodiment. Menu 902 may be scrollable to bring additional expanded tiles into the display, removing others. Control 902A is associated with control 708G in that each represents the same VTO look and effects. Control 902A is selected and active in FIG. 9. A UI element comprising the text, "Learn More" is associated with a control 902B that when invoked changes region 708 to provide more information about the particular look associated with control 902A.

Figure 10:
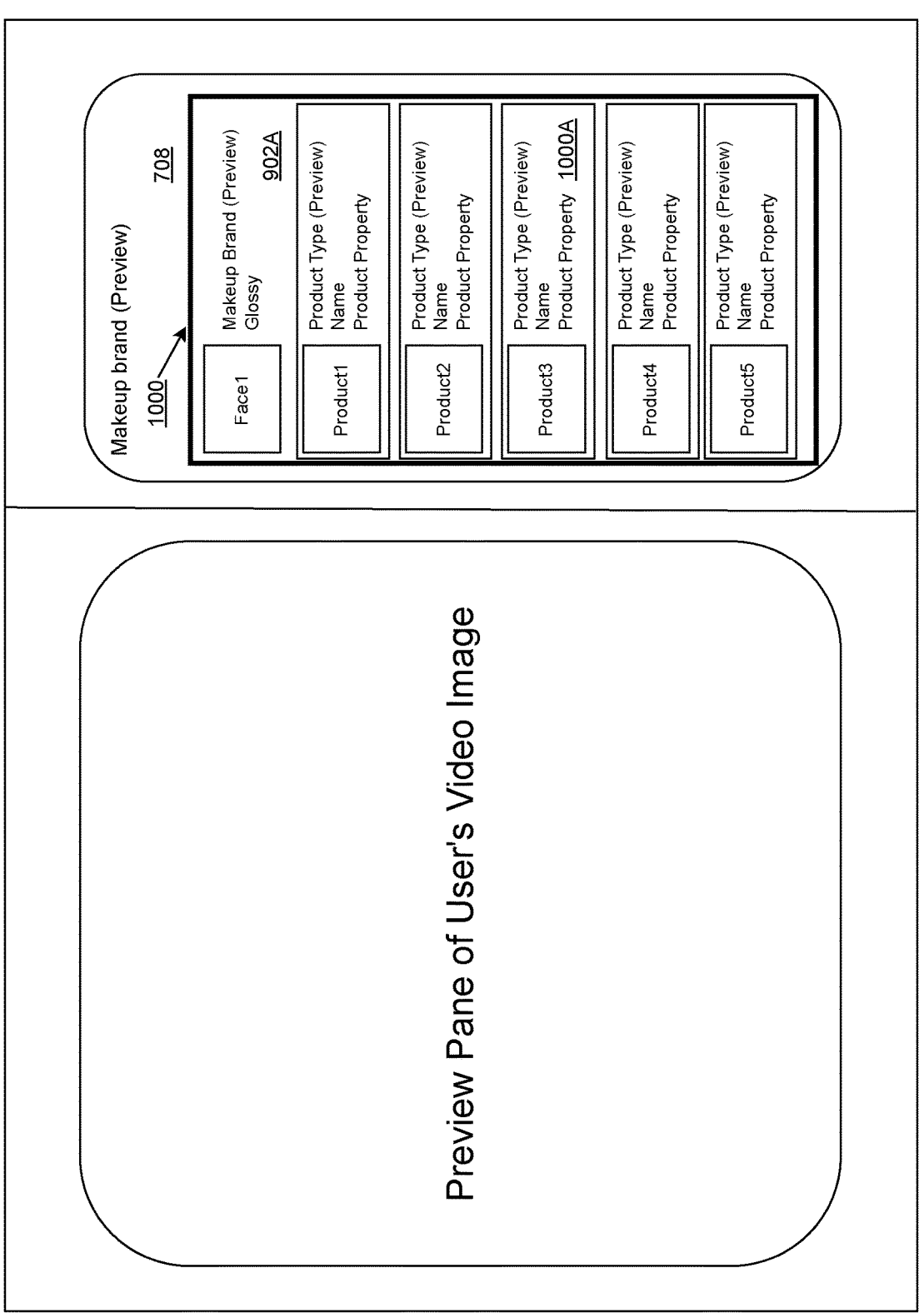

FIG. 10 is an illustration of the portion of the user interface 700, in accordance with an embodiment, showing look information in a menu 1000 in region 708 for a representative look (e.g. a selected look interface with sub interfaces for each product/effect to be applied), such as through invocation of control 902A. Menu 1000 includes tile 902A with the UI element and associated control 902B removed as well as a plurality of tiles (e.g. product tile 1000A) providing information for respective products (e.g. Product 1 to Product 5). Each tile shows product type (e.g. lipcolor, mascara, eyeliner, brow, foundation, blush, high-lighter, etc.), product name (which may be proprietary to a brand (e.g. Fit Me™ foundation from Maybelline)) and a color or other product feature (which may be proprietary such as Molten Rose Gold™ color of Master Chrome Highlighter™ available from Maybelline).

Though not shown, in an embodiment, product tiles (e.g. 1000A) in menu 1000 are each associated with a "Buy Now" control (e.g. a button control). The user interface is provided with the button control, such that when clicked or otherwise invoked by user input, the user interface receives the user input and provides access to the user to a brand product page (e.g. via a web browser, for example) to purchase the actual product. The product can be purchased via an e-commerce transaction. In an embodiment a single Buy Now button form menu 1000 links to a look based product page from which respective products can be purchased. In an embodi-ment, the control invokes a web-based interface, for example, a link to a web page via the Internet for execution and display by a web browser. It will be appreciated that the user interface can be configured to provide access to an e-commerce interface in other manners such as a tab, drop down menu, right click menu while hovering over a product/effect choice, etc. Effects (and products) may comprise makeup, hair or nail effects (and products), for example.

Figure 11:
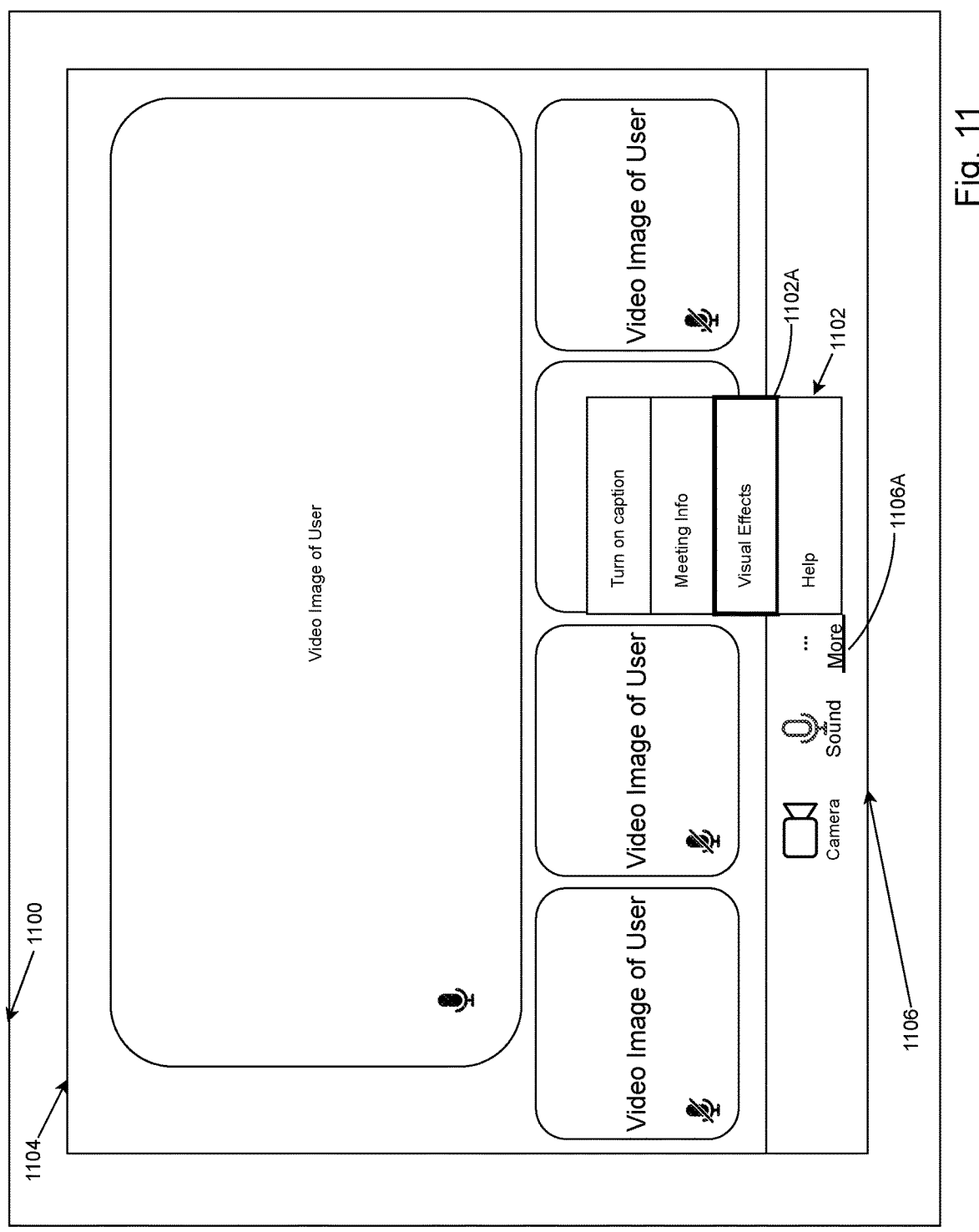

FIGS. 7 to 10 illustrate an example flow of UI operations for configuring application of a VTO filter comprising a look, for example, in a pre-conference or pre-VR chat start period (providing an embodiment of a preview mode) to initiate the conference or VR chat with an applied look. FIG. 11 is an illustration of a user interface 1100 of a video conference application with integrated VTO, in accordance with an embodiment, showing a selected drop down menu 1102 for configuring application of a VTO filter during a video conference (e.g. while video is provide to server 608 and/or received from the server 608.

UI 1100 shows a window, in an embodiment, in which, relative to FIG. 7, regions 702 and 708 are removed and replaced with region 1104 showing a live mode of the user video stream. Region 1106 is below region 1104 and pro-vides a menu having a plurality of menu items including a plurality of icons, each icon associated with a control. One such icon comprises an ellipsis, 1106A, defining a more control to invoke the drop-down menu 1102. Menu 102 presents a plurality of menu items, including menu item 1102A. Menu item 1102A is shown in bold highlight as a selected item for invoking filter selection.

Figure 12:
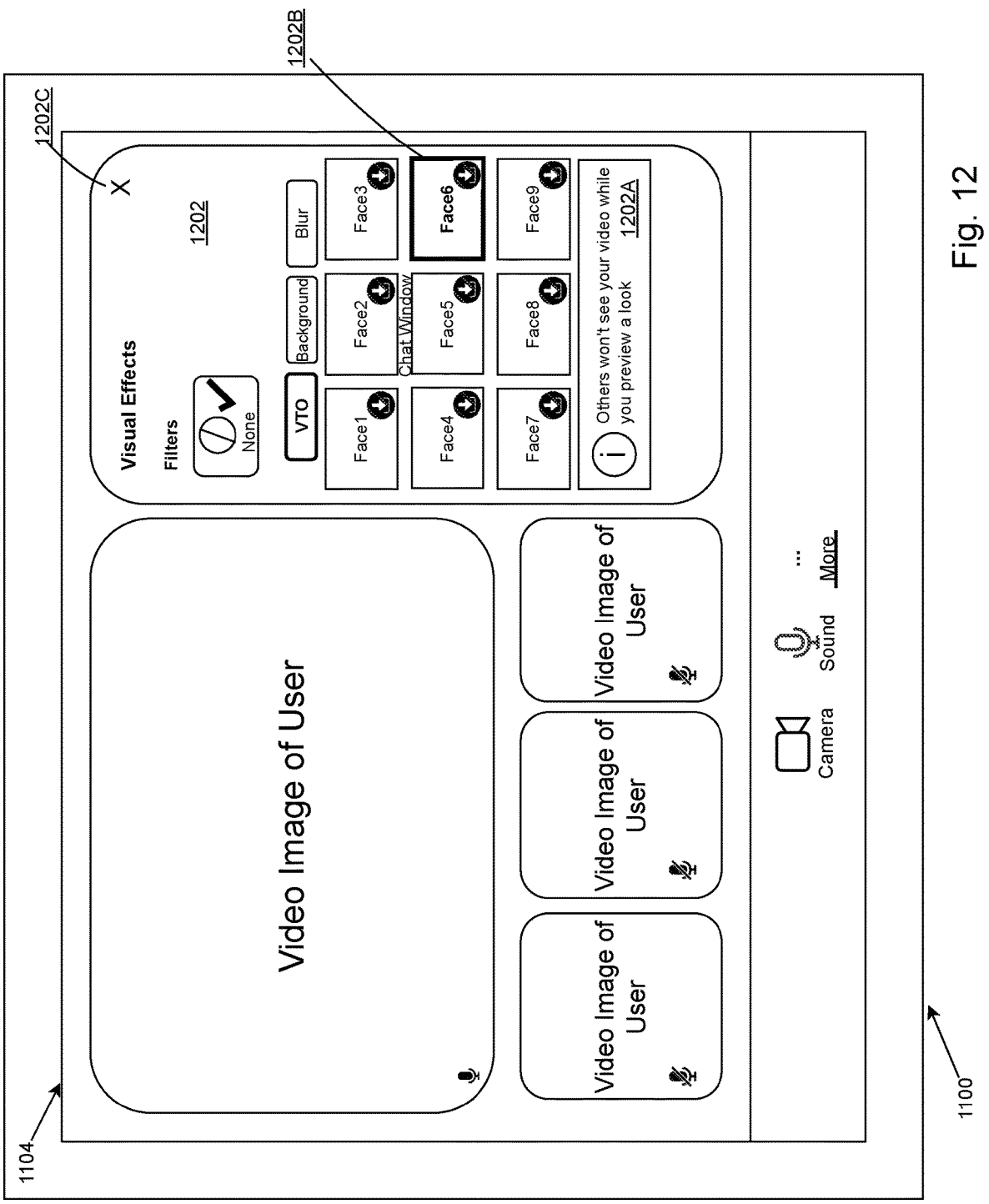

FIG. 12 is an illustration of the user interface 1100, in accordance with an embodiment, as invoked from drop down menu 1102. FIG. 12 shows a region 1202 having a VTO filter menu like that shown in region 708 of FIG. 7 for configuring application of a VTO filter comprising a look during a video conference. Region 1104 is diminished in size in US 1100 relative to FIG. 11 to provide real estate for region 1202. Invocation of video effects selection sub-interface of region 1202 puts the video stream into a preview mode. The user video stream (e.g. with VTO effects applied) is not provided to server 608. Region 1202 presents infor-mation 1202A advising of the preview mode. Selection of a tile (e.g. 1202B) selects the VTO effect(s) of the look for previewing in region 1104. Selection of the close control (e.g. "X" 1202C) closes the video effects selection sub-interface of region 1202 reverting the video to live mode with the associated VTO filter(s) of the look applied to the user's video. The video image of the user is expanded within interface 1100 and the video with effects is provided to server 608.

In an embodiment, tile order for respective looks such as shown in FIGS. 7-9 and 12 (e.g. ordering of the content for controls 708E) are determined by operations to make user-oriented recommendations. In an embodiment, operations process available information about the user, and prioritize (i.e. order) tiles (e.g. the content associated with the respec-tive tiles/controls) such as in accordance with rules or other operations to present looks so that the most recommended ones would be on placed at the top (e.g. nearer to controls 708C, for example). In an embodiment, user information for determining look order encompass a variety of factors, such as the users' existing makeup, face shape, skin tones, and which looks they have selected recently (i.e. based on a most recent order of previous selections). In an embodiment, makeup purchase history is also used as available.

In an embodiment, look order for respective looks such as shown in FIGS. 7-9 and 12 is responsive to user favorite selection. For example an option for the user to mark as favorite one or multiple looks is provided. These selected favorite looks are prioritized to the top. In an example, favorite selecting of a look overrides other operations to process user information (e.g. absent the selecting). In an embodiment, for a plurality of favorite selections, operations may order such favorite looks using processing of additional user information-favorite selected looks over unselected look, where favorite selections are ordered between them-selves based on user information processing, and unselected looks are ordered based on user information processing.

In an embodiment, alternative product choice is enabled. For example, in FIG. 10, menu 1000 is enabled to open an expanded space below a selected product tile (not shown) or to open a pop up or overlay menu. A list of alternative products is provided with associated controls so that a user is enabled to select a product replace the product in the look (e.g. in the menu 1000 and in the VTO effects to be applied). Selection of an alternative product replaces that product in the look in the menu 1000. The alternative product selection is saved for use as the associated effect and is saved for re-use such as when the look is selected for use at a later time.

In an embodiment, though not shown, a particular product can be identified (via a check box or similar control) to turn the associated filter effect off in the look for the conference. For example, a user may select the eye shadow (or another product) to turn off the associated eyeshadow effect, or back it on, etc.

In addition to computing device and method aspects, a person of ordinary skill will understand that computer program product aspects are disclosed, where instructions are stored in a non-transient storage device (e.g. a memory, CD-ROM, DVD-ROM, disc, etc.) and that, when executed, the instructions cause a computing device to perform any of the method aspects stored herein.

Some of the aspects and features will be understood from the following numbered statements:

Statement 1: A method for streamlining the applying of an effect to an object appearing in a sequence of video frames, the method comprising: a. performing in parallel i) effect rendering, and ii) object landmark determining, wherein the effect rendering applies an effect in association with landmarks determined for the object to define a sequence of output video frames with the effect applied; and b. providing the sequence of output video frames for displaying.

Statement 2: The method of Statement 1, wherein the sequence of frames comprises frame t−1, frame t and frame t+1 in sequence, and wherein step a. determines object landmarks for frame t in parallel with applying the effect to the object in association with object landmarks previously determined for frame t−1.

Statement 3: The method of Statement 2, further wherein step a. detects an occlusion of the object and wherein the effect rendering is guided by the occlusion as detected.

Statement 4: The method of Statement 3, wherein step a. provides object mask information at a pixel level according to the occlusion as detected to guide the effects rendering.

Statement 5: The method of Statement 1, wherein object landmark determining provides pixel locations for the object, the object landmark determining comprising detecting the pixel locations for at least some of the video frames using a deep neural network.

Statement 6: The method of Statement 5, wherein the sequence of frames comprises frame t−1, frame t and frame t+1 in sequence, and wherein step a. comprises stabilizing object landmarks for frame t in accordance with a prediction of the location of the object landmarks for frame t using an optical flow function.

Statement 7: The method of Statement 5, wherein the sequence of frames comprises frame t−1, frame t and frame t+1 in sequence, and wherein object landmark determining comprises computing an optical flow function in relation to frame t for predicting locations within frame t responsive to locations in frame t−1, determining an optical flow error for frame t, skipping a detecting of the pixel locations for frame t responsive to the optical flow error and using pixel locations responsive to the optical flow function.

Statement 8: The method of Statement 1, wherein for each of the video frames, the object landmark determining determines a bounding box within which the object is located, the bounding box comprising a subset of video frame pixels.

Statement 9: The method of Statement 1, wherein steps a. and b. are performed by a first computing device and wherein step b. comprises communicating the sequence of output video frames via a communication network for displaying by at least one other computing device participating in a video chat, video conference or teleconsultation with the first computing device.

Statement 10: The method of Statement 1, wherein the method applies respective effects to a plurality of respective objects and step a. performs object landmark detection for each of the plurality of respective objects and effect rendering applies respective effects relative to at least some of the plurality of respective objects.

Statement 11: The method of Statement 10, wherein the sequence of video frames includes a face, the plurality of objects comprises respective regions of the face and the respective effects comprise respective makeup effects.

Statement 12: The method of Statement 11, wherein the regions comprise any one or more of: a left eye, a left brow, a right eye, a right brow, a nose, a mouth, a top lip or a bottom lip.

Statement 13: The method of Statement 1, wherein the effect comprises a makeup effect, a hair effect or a nail effect and wherein the method comprises providing a user interface presenting a plurality of makeup, hair or nail effects associated with respective products for selection through user input, and wherein the user interface is configured to provide access to an e-commerce interface to conduct a product purchase transaction.

Statement 14: A method of applying effects to a sequence of input video frames to define a sequence of output video frames of a video chat, a video conference or a teleconsultation, the method comprising: receiving the sequence of frames comprising a first frame followed by a second frame; processing the first frame for object landmarks for at least one object; while applying one or more effects to the first frame to define an output frame, the one or more effects applied relative to at least some of the object landmarks, additionally processing the second frame to determine object landmarks; and providing the output frame for the video chat, the video conference, or the teleconsultation.

Statement 15: The method of Statement 14, wherein the one or more effects comprise virtual try on (VTO) effects to simulate one or more products.

Statement 16: The method of Statement 14, wherein the one or more effects comprise make up effects, hair effects or nail effects and the at least one object comprises a body part of a user.

Statement 17: The method of Statement 16 comprising providing a user interface presenting a plurality of makeup effects, hair effects or nail effects associated with respective products for selection through user input, the user interface configured to provide access to an e-commerce interface to conduct a product purchase transaction.

Statement 18: The method of Statement 14, wherein the method is performed by a video chat or video conferencing application.

Statement 19: The method of Statement 14, wherein the method is performed by a teleconsultation application.

Statement 20: The method of Statement 14, further wherein processing for object landmarks detects an occlusion of the object and wherein applying the one or more effects is guided by the occlusion as detected.

Statement 21: The method of claim Statement 20, wherein processing for object landmarks provides object mask information at a pixel level according to the occlusion as detected to guide the applying of the one or more effects.

Statement 22: The method of Statement 14, wherein processing for object landmarks provides pixel locations for the object using a deep neural network.

Statement 23: The method of Statement 22 comprising stabilizing object landmarks for the second frame in accordance with a prediction of the location of the object landmarks for the second frame using an optical flow function.

Statement 24: The method of Statement 22, wherein processing for object landmarks comprises computing an optical flow function in relation to the second frame for predicting locations within the second frame responsive to locations in the first frame, determining an optical flow error for the second frame, skipping a detecting of the pixel locations for the second frame responsive to the optical flow error and using pixel locations responsive to the optical flow function.

Statement 25: The method of Statement 14, wherein the sequence of video frames includes a face, the plurality of objects comprises respective regions of the face and the respective effects comprise respective makeup effects.

Statement 26: A computing device comprising a processor and a non-transient storage device storing computer executable instructions for execution by the processor to cause the computing device to perform the method of any preceding method claim.

Statement 27: A computing device comprising a processor and a non-transient storage device storing computer executable instructions for execution by the processor to cause the computing device to: provide a video chat, conference, or teleconsultation application to stream video frames to at least one other computing device; wherein the video chat or conference application is integrated with a virtual try on (VTO) pipeline to apply one or more effects to the frames to be streamed, the VTO pipeline having an object detection function and effect rendering function configured to execute in a frame-wise parallel manner to optimize the applying of the one or more effects to the frames.

Statement 28: The computing device of Statement 27, wherein the computer executable instructions for execution by the processor cause the computing device to provide effects recommendations associated with respective products comprising makeup, hair or nail products, and to provide access to an e-commerce interface for purchasing a product.

Statement 29: A computing device of claim comprising a processor and a non-transient storage device storing computer executable instructions for execution by the processor to cause the computing device to: provide a video chat, video conference, or teleconsultation application to stream video frames to at least one other computing device, the application integrated with a virtual try on (VTO) pipeline to apply one or more effects to the frames to be streamed; wherein the application is configured to present a graphical user interface (GUI) via a display screen, the GUI having: a preview mode in which to receive input to select the one or more effects from a plurality of effect options, the preview mode configured to present the one or more effects applied to a sequence of preview frames via the display screen and without streaming the preview frames to the at least one other computing device; and a live mode configured to apply the one or more effects and to stream the frames to which the effects are applied in the live mode.

Statement 30: The computing device of Statement 29, wherein subsets of the plurality of effects are grouped as respective looks, and the GUI provides a look selection interface to select a one of the looks to select the one or more effects grouped for the look.

Statement 31: The computing device of Statement 30, wherein each of the one or more effects is associated with a product and, responsive to the selection of one of the looks, the GUI is configured to present a selected look interface having respective sub interfaces for each respective effect of the one or more effects of the look, each respective sub interface providing i) product information for the respective product associated with the respective effect and ii) a refinement control to refine a selection of the respective effect.

Statement 32: The computing device of Statement 31, wherein the refinement control is configured for selecting a different product for the respective effect so that the respective effect provides a virtual try on of the different product.

Statement 33: The computing device of Statement 31, wherein the respective refinement control is configured to turn off the respective effect so that the respective effect is not applied to the frames.

Statement 34: The computing device of Statement 30, wherein each of the one or more effects is associated with a product and, responsive to the selection of one of the looks, the GUI is configured to present a selected look interface having respective sub interfaces for each respective effect of the one or more effects of the look, each respective sub interface providing i) product information for the respective product associated with the respective effect and ii) a buy now control to initiate an ecommerce interface for product purchasing.

Statement 35: The computing device of Statement 30, wherein each of the one or more effects is associated with a product and the GUI is configured to provide access to initiate an ecommerce interface for product purchasing.

Statement 36: The computing device of Statement 30, wherein the plurality of effects are any of makeup effects, hair effects or nail effects.

Statement 37: The computing device of Statement 30, wherein the look interface orders a presentation of the respective looks for selection to make user recommendations.

Statement 38: The computing device of Statement 37, wherein the order of the respective looks is determined in accordance with user information processing, the user information comprising one or more of: a users' existing makeup, a user's face shape, a user's skin tone, or any respective looks as recently selected.

Statement 39: The computing device of Statement 38, wherein one or more of the users' existing makeup, the user's face shape, or the user's skin tone is determined through processing the sequence of frames.

Statement 40: The computing device of Statement 37, wherein the order is prioritized in responsive to user favorite selection of a respective look such that favorite looks are ordered ahead of other looks and the other looks are ordered in accordance with the user information processing.

Statement 41: The computing device of Statement 29, wherein the preview mode is invokable prior to joining a particular instance of a video chat or conference, integrated with a video chat or conference user interface to configure video and audio controls for the instance.

Statement 42: The computing device of Statement 29, wherein the preview mode is invokable during participation in an instance of a video chat or conference thereby to stop any streaming of frames of video for the instance.

A feature of any method statement has an equivalent apparatus aspect such as a computing device, a system or a computer program product and vice versa.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A computing device comprising a processor and a non-transient storage device storing computer executable instructions for execution by the processor to cause the computing device to:

provide a video chat, video conference, or teleconsultation application that streams video frames to at least one other computing device, the application integrated with a virtual try on (VTO) pipeline that applies one or more effects to the video frames-to be streamed, wherein the VTO pipeline comprises an object detection function and an effect rendering function configured to execute in a frame-wise parallel manner to optimize applying of the one or more effects to the video frames;

wherein the application is configured to present a graphical user interface (GUI) via a display screen, the GUI having:

a preview mode that receives input that selects the one or more effects from a plurality of effect options, the preview mode configured to present the one or more effects applied to a sequence of preview frames via the display screen and without streaming the preview frames to the at least one other computing device; and a live mode configured to apply the one or more effects using the object detection function and the effect rendering function executing in the frame-wise parallel manner and further configured to stream the video frames to which the one or more effects are applied in the live mode; and wherein subsets of the plurality of effect options are grouped as respective looks, and the GUI provides a look selection interface displaying an option to select one of the looks; and wherein each of one or more effects grouped for a look is associated with a respective product and, responsive to a selection of one of the looks, the GUI is configured to present a selected look interface having respective sub interfaces for each respective effect of the one or more effects grouped for the look, each respective sub interface providing i) product information for the respective product associated with a respective effect and ii) a buy now control to initiate an ecommerce interface to purchase the respective product.

2. The computing device of claim 1, wherein further provides iii) a refinement control to refine a selection of the respective effect.

3. The computing device of claim 2, wherein the refinement control is configured for selecting a different product for the respective effect so that the respective effect provides a virtual try on of the different product.

4. The computing device of claim 2, wherein the refinement control is configured to turn off the respective effect so that the respective effect is not applied to the video frames.

5. The computing device of claim 1, wherein the GUI is configured to provide access to the ecommerce interface to initiate purchase of the respective product.

6. The computing device of claim 1, wherein the plurality of effect options are any of makeup effects, hair effects or nail effects.

7. The computing device of claim 1, wherein the look selection interface orders a presentation of the respective looks for selection to make user recommendations.

8. The computing device of claim 7, wherein the order of the respective looks is determined in accordance with user information processing, the user information comprising one or more of: a users' existing makeup, a user's face shape, a user's skin tone, or any respective looks recently selected.

9. The computing device of claim 8, wherein one or more of the users' existing makeup, the user's face shape, or the user's skin tone is determined through processing the sequence of preview frames.

10. The computing device of claim 7, wherein responsive to a user favorite selection of a respective look, the look selection interface prioritizes an order of the presentation of the respective looks such that favorite looks are ordered ahead of other respective looks and the other respective looks are ordered in based on user information processing.

11. The computing device of claim 1, wherein the preview mode is invokable prior to a user joining a particular instance of the video chat or the conference, and the preview mode is integrated with a video chat or conference user interface to configure video and audio controls for the instance.

12. The computing device of claim 1, wherein the preview mode is invokable during participation in an instance of the video chat or the conference, and in response to a user invoking the preview mode, stops streaming of the video frames.

13. A computer program product comprising a non-transient storage device storing computer readable instructions that when executed by a processor cause a computing device to:

execute a video chat, video conference, or teleconsultation application that streams video frames to at least one other computing device, the application integrated with a virtual try on (VTO) pipeline that applies one or more effects to the video frames, wherein the VTO pipeline comprises an object detection function and an effect rendering function configured to execute in a frame-wise parallel manner to optimize applying of the one or more effects to the video frames;

wherein the application is configured to present a graphical user interface (GUI) via a display screen, the GUI having:

a preview mode that receives input that selects the one or more effects from a plurality of effect options, the preview mode configured to present the one or more effects applied to a sequence of preview frames via the display screen and without streaming the preview frames to the at least one other computing device; and a live mode configured to apply the one or more effects using the object detection function and the effect rendering function executing in the frame-wise parallel manner and further configured to stream the video frames to which the one or more effects are applied in the live mode; and wherein subsets of the plurality of effect options are grouped as respective looks, and the GUI provides a look selection interface displaying an option to select one of the looks; and wherein each of one or more effects grouped for a look is associated with a respective product and, responsive to a selection of one of the looks, the GUI is configured to present a selected look interface having respective sub interfaces for each respective effect of the one or more effects grouped for the look, each respective sub interface providing i) product information for the respective product associated with a respective effect and ii) a buy now control to initiate an ecommerce interface to purchase the respective product.

14. A computer implemented method comprising:

executing, by a computing device, a video chat, video conference, or teleconsultation application that streams video frames to at least one other computing device, the application integrated with a virtual try on (VTO) pipeline that applies one or more effects to the video frames, wherein the VTO pipeline comprises an object detection function and an effect rendering function that execute in a frame-wise parallel manner to optimize applying of the one or more effects to the video frames;

wherein the application is configured to present a graphical user interface (GUI) via a display screen, the GUI having a preview mode and a live mode;

receiving, by the computing device and during the preview mode, input to select the one or more effects from a plurality of effect options, the preview mode presenting the one or more effects applied to a sequence of preview frames via the display screen and without streaming the preview frames to the at least one other computing device; and applying, by the computing device and during the live mode, the one or more effects using the object detection function and the effect rendering function executing in the frame-wise parallel manner and streaming, by the computing device and during the live mode, the video frames to which the one or more effects are applied in the live mode; and grouping subsets of the plurality of effect options as respective looks, and the GUI providing a look selection interface displaying an option to select one of the looks, wherein each of one or more effects grouped for a look is associated with a respective product; and responsive to a selection of one of the looks, the GUI is configured to present a selected look interface having respective sub interfaces for each respective effect of the one or more effects grouped for the look, each respective sub interface providing i) product information for a respective product associated with the respective effect and ii) a buy now control to initiate an ecommerce interface to purchase the respective product.

* * * * *